(12) United States Patent
Kiss et al.

(10) Patent No.: US 10,979,355 B2
(45) Date of Patent: Apr. 13, 2021

(54) MULTIPATH TRANSMISSION CONTROL PROTOCOL PROXY USE IN A CELLULAR NETWORK

(71) Applicant: Apple Inc., Cupertino, CA (US)

(72) Inventors: Krisztian Kiss, Hayward, CA (US); Christoph Paasch, Cupertino, CA (US); Farouk Belghoul, Campbell, CA (US); Sarma V. Vangala, San Jose, CA (US); Rohan C. Malthankar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/365,641

(22) Filed: Mar. 26, 2019

(65) Prior Publication Data

US 2019/0306068 A1 Oct. 3, 2019

Related U.S. Application Data

(60) Provisional application No. 62/651,569, filed on Apr. 2, 2018, provisional application No. 62/742,677, filed on Oct. 8, 2018.

(51) Int. Cl.
*H04L 12/801* (2013.01)
*H04L 12/707* (2013.01)
(Continued)

(52) U.S. Cl.
CPC ............ *H04L 47/193* (2013.01); *H04L 45/24* (2013.01); *H04W 36/08* (2013.01); *H04W 60/00* (2013.01); *H04W 80/06* (2013.01); *H04W 84/12* (2013.01)

(58) Field of Classification Search
CPC ....... H04L 47/193; H04L 45/24; H04L 47/41; H04L 67/28; H04W 36/08; H04W 60/00;
(Continued)

(56) References Cited

U.S. PATENT DOCUMENTS 9,998,569 B2 6/2018 Roeland
2012/0020284 A1 1/2012 Haddad
(Continued)

FOREIGN PATENT DOCUMENTS

CN 1949930 A 4/2007
CN 103262587 A 8/2013
(Continued)

OTHER PUBLICATIONS

Rebecchi, Filippo, et al.; "Data Offloading Techniques in Cellular Networks: A Survey"; IEEE Communications Surveys and Tutorials 17.2 (2015); Nov. 10, 2014; 25 pages.
(Continued)

*Primary Examiner* — Walli Z Butt
(74) *Attorney, Agent, or Firm* — Kowert, Hood, Munyon, Rankin & Goetzel, P.C.

(57) ABSTRACT

This disclosure relates to techniques for providing a multipath transmission control protocol proxy in a cellular network. A wireless device may establish a wireless link with a cellular network. The wireless device may provide an indication that the wireless device is multipath transmission control protocol (MPTCP) capable to a core network entity of the cellular network. The wireless device may receive MPTCP proxy information for a MPTCP proxy comprised in the cellular network from the core network entity. The MPTCP proxy information may include MPTCP server IP address and port information. The wireless device may establish a first MPTCP flow with the MPTCP proxy comprised in the cellular network via the wireless link.

19 Claims, 13 Drawing Sheets

(51) Int. Cl.
*H04W 36/08* (2009.01)
*H04W 60/00* (2009.01)
*H04W 80/06* (2009.01)
*H04W 84/12* (2009.01)

(58) Field of Classification Search
CPC . H04W 80/06; H04W 84/12; H04W 36/0022; H04W 36/0027; H04W 88/06
See application file for complete search history.

(56) References Cited

U.S. PATENT DOCUMENTS

| | | | |
|---|---|---|---|
| 2015/0237525 A1 | 8/2015 | Mildh | |
| 2016/0309534 A1* | 10/2016 | Teyeb | H04L 61/2007 |
| 2017/0118787 A1 | 4/2017 | Kekki | |
| 2018/0062979 A1* | 3/2018 | Zee | H04W 76/15 |
| 2018/0331944 A1 | 11/2018 | Salkintzis | |
| 2019/0363974 A1* | 11/2019 | Wang | H04L 12/66 |

FOREIGN PATENT DOCUMENTS

| | | |
|---|---|---|
| CN | 103503357 A | 1/2014 |
| CN | 103516694 A | 1/2014 |
| CN | 104285472 A | 1/2015 |
| CN | 104854837 A | 8/2015 |
| CN | 106716950 A | 5/2017 |
| CN | 107409121 A | 11/2017 |
| EP | 3182673 A1 | 6/2017 |
| WO | 2015094043 A1 | 6/2015 |

OTHER PUBLICATIONS

3GPP, Study on Access Traffic Steering, Switch and Splitting support. 3GPP TR 23.793, Jan. 31, 2018.
1ETF, TCP Extensions for Muitipath Operation with Multiple Addresses, IETF RFC 6824, Jan. 31, 2013.

\* cited by examiner

```
                    1                   2                   3
0 1 2 3 4 5 6 7 8 9 0 1 2 3 4 5 6 7 8 9 0 1 2 3 4 5 6 7 8 9 0 1
+---------------+---------------+-------+-----------------------+
|     Kind      |    Length     |Subtype|Version|A|B|C|D|E|F|G|H|
+---------------+---------------+-------+-----------------------+
|                  Option Sender's Key (64 bits)                |
|                      (if option Length > 4)                   |
+---------------------------------------------------------------+
|                 Option Receiver's Key (64 bits)               |
|                     (if option Length > 12)                   |
+-------------------------------+-------------------------------+
|   Data-Level Length (16 bits) |   Checksum (16 bits, optional)|
+-------------------------------+-------------------------------+
```

*FIG. 17*

MULTIPATH TRANSMISSION CONTROL PROTOCOL PROXY USE IN A CELLULAR NETWORK

PRIORITY INFORMATION

This application claims priority to U.S. provisional patent application Ser. No. 62/651,569, entitled "Multipath Transmission Control Protocol Proxy Use in a Cellular Network," filed Apr. 2, 2018, and to U.S. provisional patent application Ser. No. 62/742,677, entitled "Multipath Transmission Control Protocol Proxy Use in a Cellular Network," filed Oct. 8, 2018, both of which are hereby incorporated by reference in their entirety as though fully and completely set forth herein.

FIELD

The present application relates to apparatuses, systems, and methods for providing a multipath transmission control protocol proxy in a cellular network.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for providing a multipath transmission control protocol (MPTCP) proxy in a cellular network.

According to the techniques described herein, a cellular network may provide addressable/off-path MPTCP proxy support, and/or transparent/on-path MPTCP proxy support, such that wireless devices capable of accessing the cellular network via multiple access types may be able to obtain at least some benefits of MPTCP communication even in circumstances when end-to-end MPTCP communication is not supported.

In scenarios in which addressable/off-path MPTCP proxy support is provided, the cellular network may provide MPTCP proxy information such as IP address and port information for an addressable MPTCP proxy of the cellular network to a wireless device that indicates that it is MPTCP capable, which may facilitate establishment by the wireless device of MPTCP flows with the addressable MPTCP proxy of the cellular network.

Techniques are also described herein for supporting any or all of MPTCP proxy handover (e.g., in case of mobility events), MPTCP related policy requesting and provisioning, and additional access type discovery and/or selection assistance.

Further according to the techniques described herein, in scenarios in which transparent/on-path MPTCP proxy support is provided, it may be possible for a wireless device to control to which MPTCP flows the transparent MPTCP proxy is applied, and to which MPTCP flows the transparent MPTCP proxy is not applied. This may better support the possibility that a wireless device can ability to benefit from services that are MPTCP capable and would be able to support an end-to-end MPTCP connection than if the transparent MPTCP proxy were applied uniformly to all MPTCP flows.

The techniques described herein may be implemented in and/or used with a number of different types of devices, including but not limited to cellular phones, tablet computers, wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIGS. 10-17 illustrate various further exemplary aspects of a possible approach to providing a multipath transmission control protocol proxy in a cellular network, according to some embodiments.

Figure 1:
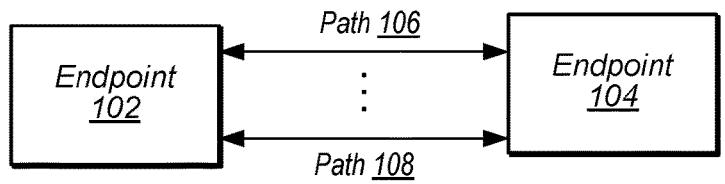
FIGS. 1-2 illustrate an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
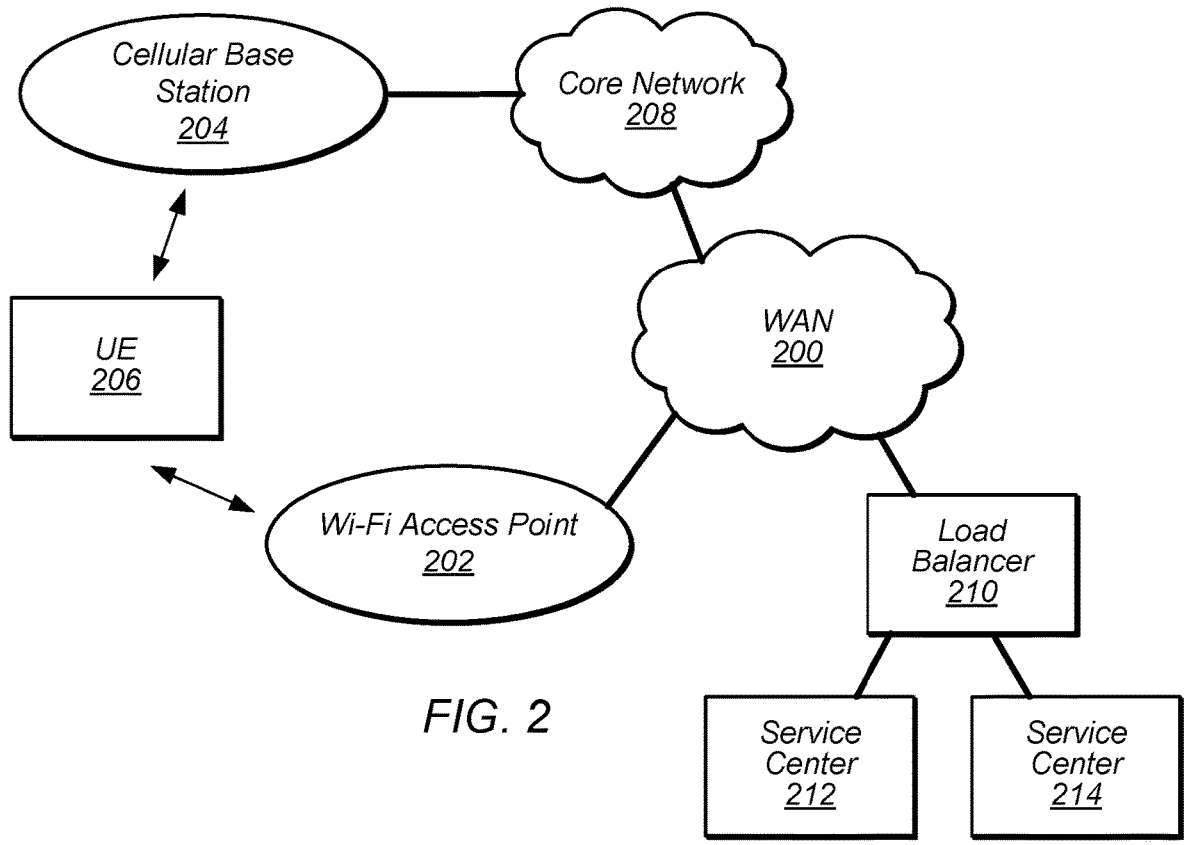
Figure 3:
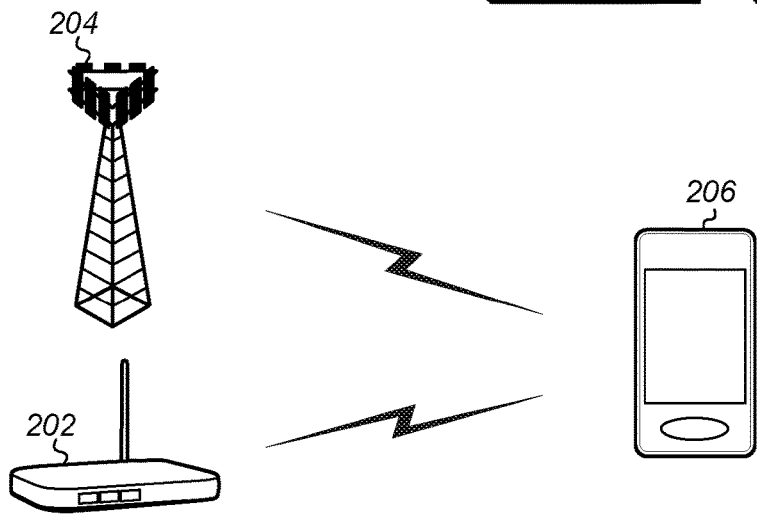
FIG. 3 illustrates an exemplary base station (BS) and an exemplary access point (AP) in communication with an exemplary wireless user equipment (UE) device, according to some embodiments.

FIGS. 1-3—Communication System

FIGS. 1-2 illustrate exemplary (and simplified) communication systems, according to certain embodiments. It is noted that the systems of FIGS. 1-2 are merely examples of possible systems, and embodiments may be implemented in any of various systems, as desired.

The exemplary wireless communication system illustrated in FIG. 1 includes two endpoints having multiple communication paths between them. Thus, endpoint 102 may be capable of communicating with endpoint 104 via path 106 or path 108.

Each of endpoint 102 and endpoint 104 may be a 'fixed' or 'mobile' endpoint. A fixed endpoint may be an endpoint which is substantially stationary and/or which communicates by way of one or more wired communication techniques. Some examples might include a server computer providing cloud-based services via the Internet, a bridge, a load balancer, a personal desktop computer or workstation, a set top box, a television, etc. A mobile endpoint may be an endpoint which is substantially mobile and/or which communicates by way of one or more wireless communication techniques. Some examples might include a mobile telephone or smart phone, tablet computer, portable gaming device, portable media player, etc. Note that hybrid endpoints which share traits of both fixed and mobile endpoints are also possible. For example, many laptop computers may be capable of performing both wireless (e.g., Wi-Fi) and wired (e.g., Ethernet) communication, and additionally may be capable of substantial movement (e.g., when operating from batter reserve power) or may be substantially stationary (e.g., when docked and/or connected to a wall outlet for power) at various times.

One or both of endpoints 102, 104 may be multihomed. For example, one or both of endpoint 102, 104 may be capable of communicating via multiple network interfaces. As such, there may be multiple possible communication paths 106, 108 between endpoints 102, 104. Note that although two paths (i.e., path 106 and path 108) are illustrated in FIG. 1, it should be noted that any number of paths may exist between endpoints. For example, if each of endpoints 102, 104 are capable of communicating via two different network interfaces, there might be four possible communication paths between them. Other numbers of different network interfaces and possible communication paths are also possible.

The multiple communication paths 106, 108 may be used to establish a multipath transmission control protocol (MPTCP) link or connection between endpoints 102 and 104. The MPTCP connection may be established according to and/or include any of various features described in the MPTCP specification IETF RFC 6824, at least according to some embodiments. For example, one or more subflows of the MPTCP connection may be established over path 106, while one or more subflows of the MPTCP connection may be established over path 108. Any number of additional subflows may optionally be created over one or more other paths, if desired. Such a MPTCP connection may be established and configured/controlled according to various aspects of the present disclosure.

The exemplary wireless communication system illustrated in FIG. 2 represents one possible communication system having the characteristics of the exemplary wireless communication system illustrated in FIG. 1. In particular, a first endpoint (e.g., a wireless user equipment ("UE") device 206) may be capable of communicating with another endpoint (e.g., load balancer 210) using either of a first communication path (e.g., via cellular base station 204, core network 208, and wide area network 200) or a second communication path (e.g., via Wi-Fi access point 202 and wide area network 200).

As shown, the UE device 206 communicates with a Wi-Fi access point 202 and with a cellular base station 204. The access point 202 may be an access point providing a wireless local area network (WLAN). The access point 202 may be equipped to communicate with a wide area network (WAN) 200, such as the Internet. Thus, the access point 202 may facilitate communication between the UE 206 and the network 200. The access point 202 and the UE 206 may be configured to communicate over the transmission medium using Wi-Fi, including any of various versions of IEEE 802.11 (e.g., a, b, g, n, ac, ax, etc.). Note that the access point 202 may also facilitate communication between the UE and other computing devices which also participate in the WLAN directly. Though not shown in FIG. 2, it should be noted that it is also or alternatively possible that the access point 202 may be equipped to communicate with a cellular core network such as core network 208, e.g., if the access point 202 is a cellular service provider deployed access point.

The base station 204 may be a base transceiver station (BTS) or cell site (a "cellular base station"), and may include hardware that enables wireless communication with cellular devices (such as UE 206) according to one or more cellular communication protocols. If the base station 204 is implemented in the context of LTE, it may alternately be referred to as an 'eNodeB'. If the base station 204 is implemented in the context of 5G NR, it may alternately be referred to as an 'gNodeB'. The UE 206 and the cellular base station 204 may communicate using any of various cellular communication technologies such as GSM, UMTS (WCDMA, TD-SCDMA), LTE, LTE-Advanced (LTE-A), 5G NR, HSPA, 3GPP2 CDMA2000 (e.g., 1×RTT, 1×EV-DO, HRPD, eHRPD), etc.

As shown, the cellular base station may be equipped to communicate with a core network 208 (potentially including any number of core network slices) of a cellular service provider (e.g., a public land mobile network (PLMN). Thus, the base station 204 may facilitate communication between the UE 206 and the core network 208. The core network 208 may in turn be equipped to communicate with WAN 200 (e.g., the Internet, or another wide area network). Note that the core network 208 may also or alternatively be equipped to communicate with one or more other networks (e.g., a telecommunication network such as a public switched telephone network (PSTN), one or more core networks of other cellular service providers, etc.). The cellular base station 204 may thus provide the UE 206 (and potentially numerous other UEs) with various telecommunication capabilities, such as voice and SMS services and/or data services.

The communication area (or coverage area) of the base station may be referred to as a "cell." Base station 204 and other similar base stations operating according to the same or a different cellular communication standard may be provided as a network of cells, which may provide continuous or nearly continuous overlapping service to UEs and similar devices over a geographic area via one or more cellular communication standards. In other words, at least according to some embodiments, the base station 204 may function as a node in the radio access network (RAN) of a cellular network operator.

Thus, UE 206 may be capable of communicating using multiple wireless communication standards, including at least one wireless networking protocol (e.g., Wi-Fi) and at least one cellular communication protocol (e.g., GSM, UMTS (WCDMA, TD-SCDMA), LTE, LTE-Advanced (LTE-A), NR, HSPA, 3GPP2 CDMA2000 (e.g., 1×RTT, 1×EV-DO, HRPD, eHRPD), etc.). Note additionally that the UE 206 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. In addition, or as an alternative, the UE 206 may be capable of communicating using one or more wired communication standards. For example, the UE 206 may be capable of communicating with one or more wired access points, e.g., via Ethernet. It may, for example, be possible for the UE 206 to couple via wired means to the Wi-Fi access point 202 in addition to or as an alternative to utilizing Wi-Fi communication. Other combinations of wireless and wired communication standards (including more than two wireless and/or wired communication standards) are also possible.

The load balancer 210 may also be equipped to communicate with WAN 200. The load balancer 210 may provide access to a cluster or server farm configured to provide one or more cloud-based services via the Internet. For example, as shown, the load balancer may further be equipped to communicate with service centers 212, 214, which may each include one or more computing devices (e.g., servers) configured to provide cloud-based services. Each service center might, for example, be configured to provide service with respect to a particular application, such as a mapping application, an intelligent personal assistant application, an e-commerce application, a media streaming application, a gaming application, etc. It should be noted that while load balancer 210 is shown in FIG. 2 as one possible exemplary access port (and potential MPTCP endpoint) to service centers 212, 214, any of various devices may be used (alternatively or in combination with load balancer 210) as intermediary/access port devices/entities to the service centers 212, 214 if desired, such as gateways, routers, firewalls, and/or any of various other "middleboxes". In addition, it should be noted that while not explicitly shown, the load balancer 210 may include any number of network interfaces for connecting to the WAN 200, including one or more wired network interfaces and/or one or more wireless network interfaces.

FIG. 3 illustrates the UE device 206 in communication with the cellular base station 204 and the Wi-Fi access point 202. The UE 206 may be a device with multiple wireless network connectivity such as a mobile phone, a hand-held device, a wearable device, a computer or a tablet, or virtually any type of wireless device.

The UE 206 may include a processor (processing element) that is configured to execute program instructions stored in memory. The UE 206 may perform any of the method embodiments described herein by executing such stored instructions. Alternatively, or in addition, the UE 206 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 206 may be configured to communicate using any of multiple wireless communication protocols. For example, the UE 206 may be configured to communicate using at least one cellular communication protocol (such as GSM, UMTS, CDMA2000, LTE, LTE-A, NR, etc.) and Wi-Fi. Other combinations of wireless and/or wired communication standards are also possible.

The UE 206 may include one or more antennas for communicating using one or more wireless communication protocols or technologies. In one embodiment, the UE 206 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 206 may share one or more parts of a receive and/or transmit chain between multiple wireless communication technologies, such as those discussed above.

In some embodiments, the UE 206 may include separate (and possibly multiple) transmit and/or receive chains (e.g., including separate RF and/or digital radio components) for each wireless communication protocol with which it is configured to communicate. As a further possibility, the UE 206 may include one or more radios that are shared between multiple wireless communication protocols, and one or more radios that are used exclusively by a single wireless communication protocol. For example, the UE 206 might include a shared radio for communicating using either of LTE or 1×RTT (or LTE or GSM, or LTE or NR, etc.), and separate radios for communicating using each of Wi-Fi and Bluetooth. Other configurations are also possible.

Figure 4:
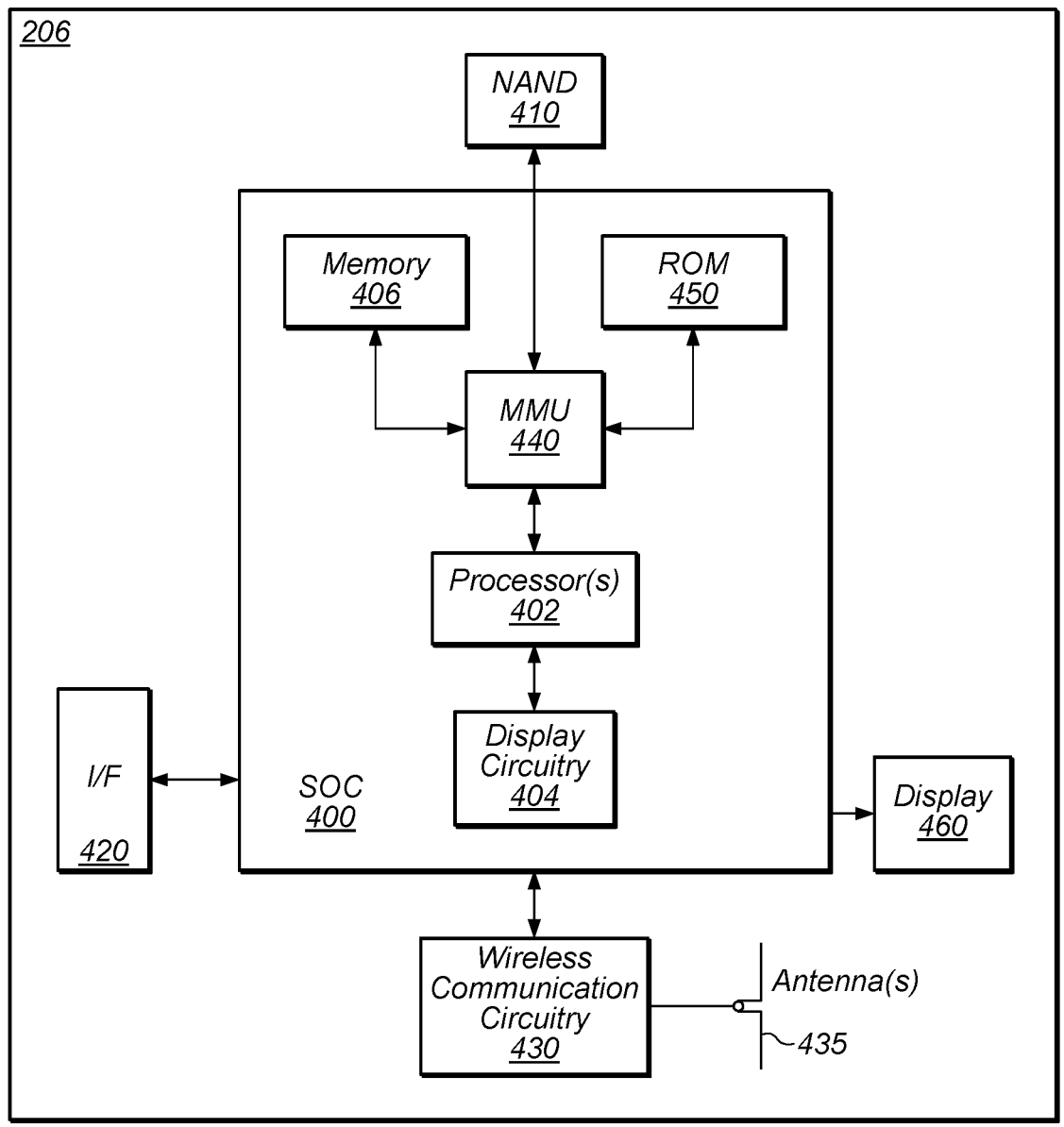
FIG. 4 illustrates an exemplary block diagram of a UE device, according to some embodiments.

FIG. 4—Exemplary Block Diagram of a UE

FIG. 4 illustrates an exemplary block diagram of a UE 206, according to some embodiments. As shown, the UE 206 may include a system on chip (SOC) 400, which may include portions for various purposes. For example, as shown, the SOC 400 may include processor(s) 402 which may execute program instructions for the UE 206 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the UE 206. For example, the UE 206 may include various types of memory (e.g., including NAND flash 410), a connector interface 420 (e.g., for coupling to a computer system, dock, charging station, etc.), the display 460, and wireless communication circuitry (e.g., radio(s)) 430 (e.g., for LTE, NR, Wi-Fi, GPS, etc.).

As noted above, the UE 206 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 206 may include at least one antenna (and possibly multiple antennas, e.g., for MIMO and/or for implementing different wireless communication technologies, among various possibilities), for performing wireless communication with cellular base stations and/or other devices. For example, the UE device 206 may use antenna(s) 435 to perform the wireless communication.

As described further subsequently herein, the UE 206 may include hardware and/or software components for implementing and/or supporting implementation of features described herein. The processor 402 of the UE device 206 may be configured to implement part or all of the methods described herein, e.g., by executing program instructions stored on a memory medium (e.g., a non-transitory computer-readable memory medium). In other embodiments, processor 402 may be configured as a programmable hardware element, such as an FPGA (Field Programmable Gate Array), or as an ASIC (Application Specific Integrated Circuit). Alternatively (or in addition) the processor 402 of the UE device 206, in conjunction with one or more of the other components 400, 404, 406, 410, 420, 430, 435, 440, 450, 460 may be configured to implement part or all of the features described herein.

Figure 5:
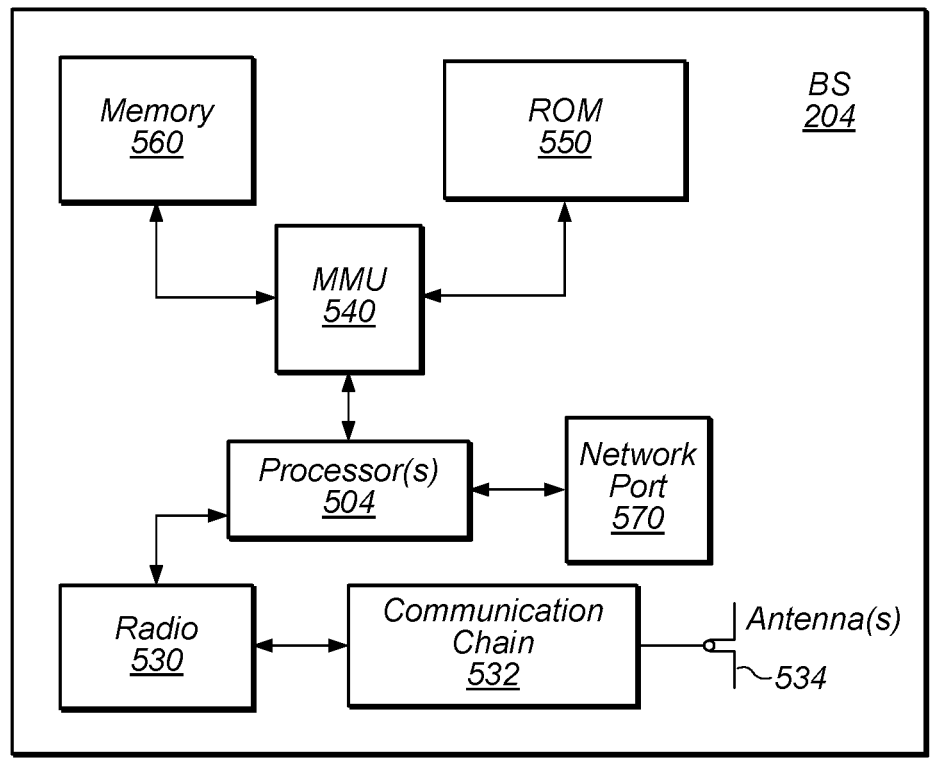
FIG. 5 illustrates an exemplary block diagram of a BS, according to some embodiments.

FIG. 5—Exemplary Block Diagram of a Base Station

FIG. 5 illustrates an exemplary block diagram of a base station 204. It is noted that the base station of FIG. 4 is merely one example of a possible base station. As shown, the base station 204 may include processor(s) 504 which may execute program instructions for the base station 204. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 204 may include at least one network port 570. The network port 570 may be configured to couple to a network and provide a plurality of devices, such as UE devices 206, access to the network as described previously herein.

In some instances, the network port 570 (or an additional network port) may be configured to couple to any of various possible cellular network entities, e.g., including one or more core network instances or core network slices of a cellular service provider, a network slice selection function, an access and mobility management function, a session management function, and/or various other possible cellular network entities. The core network(s) may provide mobility related services and/or other services to a plurality of devices, such as UE devices 206. In some cases, the network port 570 may couple to a telephone network via the core network(s), and/or the core network(s) may provide a telephone network (e.g., among other UE devices serviced by the cellular service provider).

The base station 204 may include at least one antenna 534, and possibly multiple antennas. The antenna(s) 534 may be configured to operate as a wireless transceiver and may be further configured to communicate with UE devices 206 via radio 530. The antenna(s) 534 communicates with the radio 530 via communication chain 532. Communication chain 532 may be a receive chain, a transmit chain or both. The radio 530 may be configured to communicate via various wireless telecommunication standards, including, but not limited to, LTE, LTE-A, NR, UMTS, CDMA2000, Wi-Fi, etc.

The BS 204 may be configured to communicate wirelessly using multiple wireless communication standards. In some instances, the base station 204 may include multiple radios, which may enable the base station 204 to communicate according to multiple wireless communication technologies. For example, as one possibility, the base station 204 may include an LTE radio for performing communication according to LTE as well as a Wi-Fi radio for performing communication according to Wi-Fi. In such a case, the base station 204 may be capable of operating as both an LTE base station and a Wi-Fi access point. As another possibility, the base station 204 may include a multi-mode radio which is capable of performing communications according to any of multiple wireless communication technologies (e.g., NR and LTE, NR and Wi-Fi, LTE and Wi-Fi, LTE and UMTS, LTE and CDMA2000, UMTS and GSM, etc.).

The BS 204 may be configured to act as a node of a radio access network (RAN) of a cellular network. Thus, the BS 204 may provide radio access to the cellular network (e.g., including one or more core network instances, as previously noted) to wireless devices. According to some embodiments, the BS 204 may be configured to implement multiple possible RAN slices, e.g., to accommodate different scenarios with respect to RAN functionality, performance, isolation, etc. The different RAN slices may include different sets of RAN functions, and/or differently configured RAN functions (e.g., having different resource pools, etc.).

As described further subsequently herein, the BS 204 may include hardware and software components for implementing and/or supporting implementation of features described herein. The processor 504 of the base station 204 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. Alternatively (or in addition) the processor 504 of the BS 204, in conjunction with one or more of the other components 530, 532, 534, 540, 550, 560, 570 may be configured to implement or support implementation of part or all of the features described herein.

Figure 6:
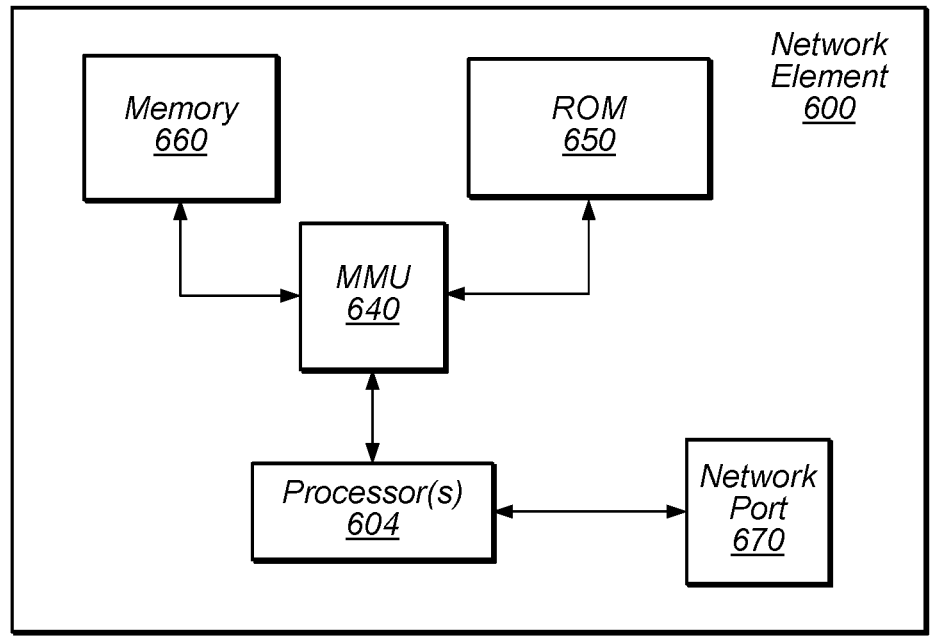
FIG. 6 illustrates an exemplary block diagram of a core network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as an access and mobility management function (AMF) or mobility management entity (MME), a session management function (SMF), a serving gateway (S-GW), a network slice selection function (NSSF) entity, a MPTCP proxy, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

FIGS. 7-17—Providing a MPTCP Proxy in a Cellular Network

As described previously herein, MPTCP may be used to provide a communication link between endpoints that encompasses multiple communication paths. Such a link may provide the reliability and congestion control features of TCP, and may further provide opportunities for managing handover/aggregation between the multiple communication paths.

One possibility for utilizing MPTCP may include establishing a MPTCP link between the ultimate endpoints between which communication is being performed. For such a technique to be effective, both endpoints may need to be capable of supporting MPTCP communication. However, if the different endpoints are provided/operated by different parties (e.g., as may be common for communication between user devices and Internet based application/service providers, as one example), it may be the case that only one party supports MPTCP, e.g., while the other party supports legacy TCP operation.

Figure 7:
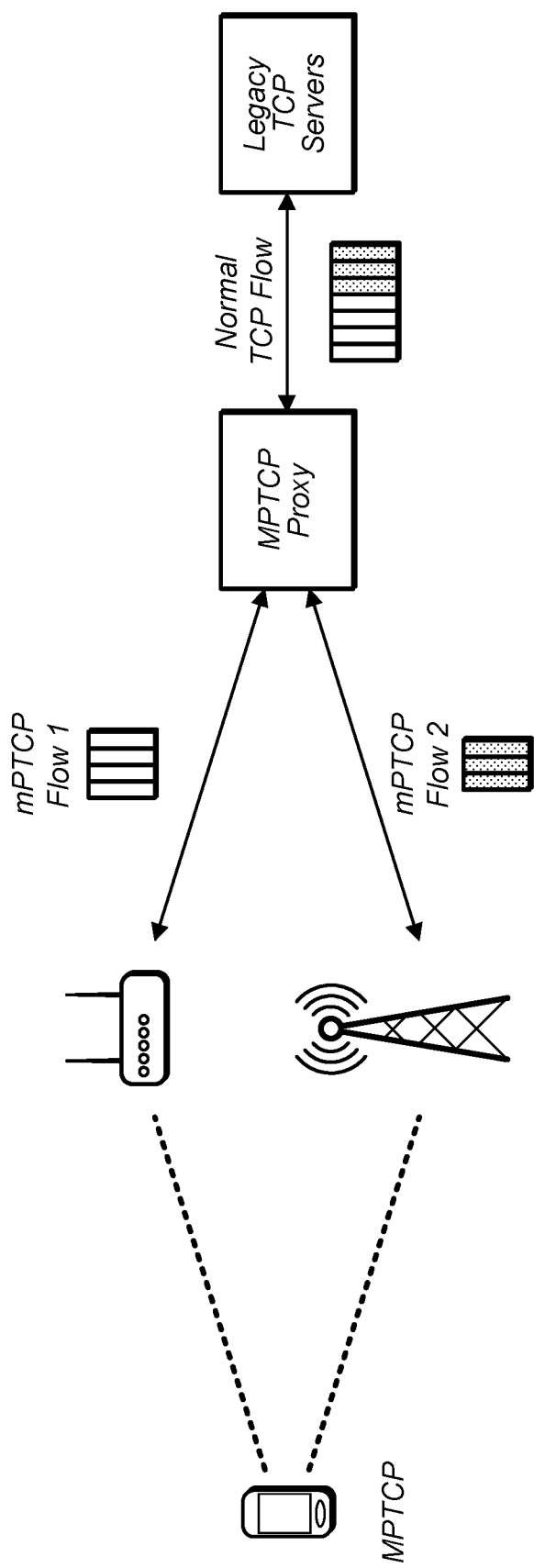
FIG. 7 illustrates aspects of an exemplary wireless communication system including a multipath transmission control protocol proxy, according to some embodiments.

As another option, it may be possible to utilize a MPTCP proxy device, as an intermediary device between endpoints, e.g., to capture at least some of the possible benefits of MPTCP, for example in case one of the endpoints does not support MPTCP. For example, as shown in FIG. 7, it may be possible to provide a MPTCP proxy between a MPTCP capable wireless device and one or more legacy TCP servers, such that the wireless device can establish MPTCP flows with the MPTCP proxy over Wi-Fi and cellular communication links. The MPTCP proxy can communicate with the legacy TCP server(s) using a legacy TCP link. In this case, the wireless device may be able to obtain the benefit of MPTCP with respect to the Wi-Fi and cellular communication links when it communicates with the legacy TCP server(s).

Thus, use of a MPTCP proxy may make it possible to achieve the benefits of multipath TCP for access aggregation and route selection without requiring multipath TCP in all Internet servers, at least according to some embodiments. As one possibility for providing widespread MPTCP proxy support, procedures and mechanisms could be introduced to one or more cellular communication technologies, and MPTCP proxies could be provided by one or more cellular networks implementing those cellular communication technologies. For example, 3GPP procedures and mechanisms for introducing MPTCP proxies as components in 5G NR core networks may be used to support MPTCP connections by wireless devices that support 5G NR communication via both 5G NR and Wi-Fi radio access.

Figure 8:
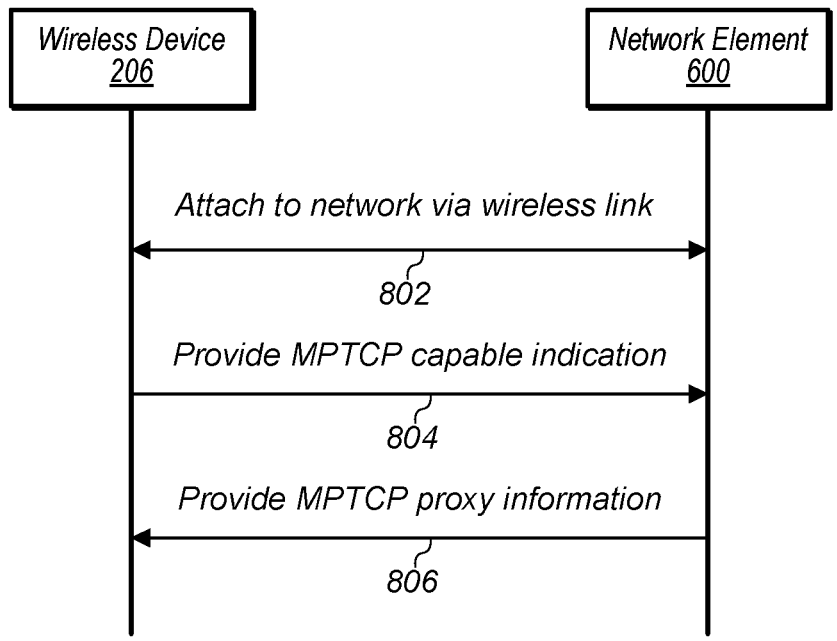
FIG. 8 is a communication flow diagram illustrating exemplary aspects of a possible approach to providing a multipath transmission control protocol proxy in a cellular network, according to some embodiments.

FIG. 8 illustrates aspects of such techniques for providing a MPTCP proxy in a cellular network. Aspects of the method of FIG. 8 may be implemented by a wireless device and/or one or more cellular network elements, such as the UE 206 and/or the network element 600 illustrated in and described with respect to various of the Figures herein, or more generally in conjunction with any of the computer circuitry, systems, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 8 are described in a manner relating to the use of communication techniques and/or features associated with NR and/or 3GPP specification documents, such description is not intended to be limiting to the disclosure, and aspects of the method of FIG. 8 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 8 may operate as follows.

In 802, a wireless device may attach to a cellular network via a wireless link. According to some embodiments, the wireless link may include a cellular link according to 5G NR. For example, the wireless device may establish a session with an AMF entity of the cellular network by way of a gNB that provides radio access to the cellular network. Alternatively, the cellular network may operate according to another cellular communication technology (e.g., LTE, UMTS, CDMA2000, GSM, etc.), e.g., in which case radio access to the cellular network via that cellular communication technology may be possible.

As another (e.g., additional or alternative) possibility, the wireless device may be able to access the cellular network via a Wi-Fi or other non-cellular wireless link. For example, the wireless device may be able to establish an IPsec session with a non-3GPP interworking function (N3IWF) via a WLAN to attach to the AMF of a 5G NR cellular network.

In 804, the wireless device may provide an indication (e.g., to the AMF or another network element of the cellular network) that the wireless device is MPTCP capable. For example, the wireless device may provide such an indication in conjunction with UE capability information provided during packet data network establishment. In some instances, the wireless device may further indicate a preference to establish a protocol data unit (PDU) session using MPTCP.

In 806, the network element may provide MPTCP proxy information for a MPTCP proxy deployed by the cellular network to the wireless device, e.g., based at least in part on the indication that the wireless device is MPTCP capable and/or the indication of a preference to establish a PDU session using MPTCP. The MPTCP proxy information may include MPTCP server IP address(es), port information and type for the MPTCP proxy. According to some embodiments, the network may allocate two IP addresses/prefixes for the wireless device, one associated with cellular network access and another associated with non-cellular communication, e.g., Wi-Fi. It may be the case that these two IP addresses are used only by the MPTCP functionality in the wireless device. The MPTCP proxy information may be provided as part of configuring a PDU session, at least according to some embodiments.

Using the MPTCP proxy information for the MPTCP proxy deployed by the cellular network, the wireless device may establish a first MPTCP flow with the MPTCP proxy. The first MPTCP flow may be established via 5G NR cellular communication (or other cellular communication), as one possibility. Alternatively, at least in some instances, it may be possible for the first MPTCP flow may be established via non-cellular communication, such as by way of a Wi-Fi access point and a N3IWF function of the cellular network.

At least in some instances, the wireless device may further establish a second MPTCP flow with the MPTCP proxy, e.g., using another wireless communication technology. For example, the second MPTCP flow may be established via a Wi-Fi link if the first MPTCP flow is established via a cellular link, or vice versa.

It may be possible for the cellular network to provide assistance with discovering and/or selecting a Wi-Fi network to utilize in conjunction with establishing a MPTCP flow, in some instances. For example, the network element could provide MPTCP Wi-Fi measurement configuration information to the wireless device, e.g., in conjunction with NR RRC configuration information, as one possibility. The MPTCP Wi-Fi measurement configuration information could include a list of one or more Wi-Fi access points (APs), possibly split into trusted and untrusted APs, to the wireless device. The wireless device could utilize such a list to discover and perform measurements on the indicated APs, and to select an AP with which to associate and subsequently establish a second MPTCP flow with the MPTCP proxy. Further, if desired, the wireless device could provide measurement report information (e.g., including results of some or all measurements performed on the APs indicated by the network element) to the network element, which could in turn provide further information assisting and/or managing AP selection by the wireless device.

According to some embodiments, the cellular network may further provide mechanisms for managing MPTCP proxy use by wireless devices in mobility. For example, in some instances, when a wireless device performs handover between cells and/or undergoes other mobility events, the cellular network may determine to change the MPTCP proxy to which the wireless device connects. In such a scenario, the network element (or another network element, such as a different AMF of the cellular network that serves a different area) may provide updated MPTCP proxy information, e.g., including IP address and port information for a different MPTCP proxy. The wireless device may move the first MPTCP flow to the new MPTCP proxy, e.g., using the updated MPTCP proxy information. The change to the new MPTCP proxy could be performed in a break-before-make manner or a make-before-break manner, according to various embodiments.

Additionally or alternatively, the cellular network may provide MPTCP proxy support for multiple core network slices of the cellular network. In some instances, the various core network slices of the cellular network may be served by the same MPTCP proxy. Alternatively, in some instances, some or all different core network slices of the cellular network may be served by different MPTCP proxies. In such a scenario, if the wireless device is configured to attach to multiple core network slices of the cellular network that are served by different MPTCP proxies, the cellular network may provide the wireless device for proxy information for multiple MPTCP proxies. The wireless device may thus be able to establish MPTCP flows with each MPTCP proxy for which MPTCP proxy information is provided, and thus to utilize MPTCP in conjunction with different communication sessions associated with different core network slices of the cellular network by way of different MPTCP proxies.

Note that in conjunction with supporting use of a MPTCP proxy in a cellular network, it may be possible for the cellular network to support a variety of possible MPTCP related policies, and to provide a framework for negotiating which MPTCP related policies to use with a wireless device. For example, various possible MPTCP policies could be defined with respect to handover, aggregation, Wi-Fi AP type selection, and/or any of various other considerations. The wireless device could provide an indication of the MPTCP policies supported and/or desired by the wireless device to the cellular network. The network could in turn select one or more policies based on the indication provided by the wireless device, and provide an indication of the selected one or more policies to the wireless device, e.g., by NAS signaling or IP messages, among various possibilities.

The MPTCP proxy or proxies provided by the cellular network may provide a communicative link with a data network (e.g., the Internet) such that the wireless device is able to communicate with one or more devices (e.g., servers) by way of the MPTCP link(s) with the MPTCP proxy or proxies provided by the cellular network, e.g., even if the ultimate endpoint of the communication does not support MPTCP communication. Thus, it may be possible for a wireless device to utilize a MPTCP proxy supported by cellular communication technology procedures and mechanisms and by cellular network operation to reliably and effectively benefit from MPTCP access aggregation and route selection characteristics when communicating with third party endpoints, e.g., regardless of whether those endpoints support MPTCP, at least according to some embodiments.

The techniques described herein with respect to FIG. 8 may be useful for implementing a MPTCP proxy in a cellular network as an addressable or off-path MPTCP proxy, at least according to some embodiments. For example, in such a case, a MPTCP capable wireless device that prefers to use MPTCP in a PDU session may be configured with MPTCP proxy information such as MPTCP proxy address, port, and type, so that the wireless device can selectively send all or certain MPTCP traffic to this proxy.

Such an addressable proxy may give full control to the wireless device to decide which MPTCP traffic is subject to traverse the MPTCP proxy and which MPTCP traffic can flow end-to-end. This may be useful in case the wireless device is configured with at least some services that are MPTCP capable and support end-to-end MPTCP traffic. In this case, the service provider (e.g., and not the mobile network operator) may be in control of how the MPTCP traffic is scheduled on the various possible paths of a MPTCP connection (e.g., potentially including multiple access paths to the mobile network, such as a cellular access path and a Wi-Fi access path).

However, use of an addressable MPTCP proxy may require that a protocol option (e.g., SOCKS v4 or v5 Proxy (RFC 1928) or Transport converter (draft-ietf-tcpm-converters-01), among various possibilities) be used for the proxy to communicate with the wireless device, in some instances. Additionally, it may be possible for malicious attacks to be initiated on such an addressable MPTCP proxy, e.g., using the address/port information for such a MPTCP proxy, which may be provided to wireless devices as previously described herein, in some instances.

Accordingly, as an additional (or alternative) possibility, a cellular network could provide a transparent or on-path MPTCP proxy. Such a MPTCP proxy may reside in a network element that is always on the data path of wireless devices. For example, in a 5G core network, the network operator may deploy such a transparent MPTCP proxy inside an anchor UPF. A wireless device may not need to be configured with proxy information for such a MPTCP proxy; the MPTCP proxy may be able to transparently terminate the MPTCP traffic and convert it to TCP without requiring the wireless device to explicitly address the MPTCP traffic to the MPTCP proxy.

It may be the case that both addressable and transparent MPTCP proxies can co-exist in MPTCP proxy deployment models, e.g., since a transparent MPTCP proxy may provide at least some benefits relative to an addressable MPTCP proxy (e.g., may be less vulnerable to malicious attacks since wireless devices may not know the address/port of the MPTCP proxy, and/or MPTCP operation may be more efficient, since there may be no need for an additional protocol to communicate with the proxy), at least in some instances.

However, if such a transparent MPTCP proxy is deployed, there is also the possibility that the MPTCP proxy could terminate all MPTCP traffic for a wireless device without informing the wireless device about it, which may thus prevent the wireless device from benefitting from services that are MPTCP capable and would be able to support an end-to-end MPTCP connection.

Figure 9:
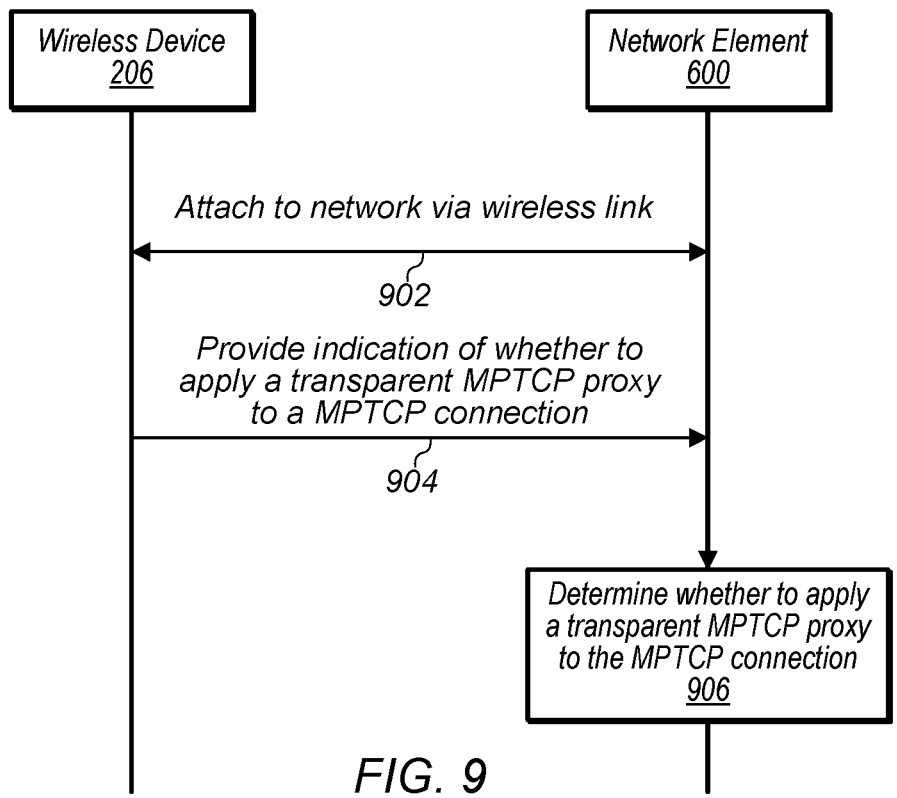
FIG. 9 is a communication flow diagram illustrating exemplary aspects of a possible method for a wireless device to control to which traffic a cellular network applies a transparent multipath transmission control protocol proxy, according to some embodiments.

Accordingly, it may be useful to provide a mechanism for a wireless device to control MPTCP proxy traversal, e.g., in the case of a transparent MPTCP proxy. FIG. 9 illustrates aspects of such a possible mechanism, at least according to some embodiments. Aspects of the method of FIG. 9 may be implemented by a wireless device and/or one or more cellular network elements, such as the UE 206 and/or the network element 600 illustrated in and described with respect to various of the Figures herein, or more generally in conjunction with any of the computer systems or devices shown in the above Figures, among other devices, as desired. Note that while at least some elements of the method of FIG. 9 are described in a manner relating to the use of communication techniques and/or features associated with NR and/or 3GPP specification documents, such description is not intended to be limiting to the disclosure, and aspects of the method of FIG. 9 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 9 may operate as follows.

In 902, a wireless device may attach to a cellular network via a wireless link. As similarly described herein with respect to FIG. 8, the wireless link may include a cellular link according to 5G NR (e.g. with an AMF entity of the cellular network by way of a gNB that provides radio access to the cellular network. Alternatively, the cellular network may operate according to another cellular communication technology (e.g., LTE, UMTS, CDMA2000, GSM, etc.), as another possibility.

As likewise described herein with respect to FIG. 8, the wireless device may also or alternatively be able to access the cellular network via a Wi-Fi or other non-cellular wireless link. For example, the wireless device may be able to establish an IPsec session with a non-3GPP interworking function (N3IWF) via a WLAN to attach to the AMF of a 5G NR cellular network.

In 904, the wireless device may provide an indication of whether to apply a transparent MPTCP proxy to a MPTCP connection of the wireless device. The MPTCP connection for which the indication is provided may include the wireless link between the wireless device and the cellular network. The indication may be provided in any of various possible ways, and may apply to a specific MPTCP connection or more generally to any MPTCP connection that is established during a MPTCP PDU data session, among various possibilities.

For example, as one possibility, the wireless device may indicate, during MPTCP PDU session establishment, the wireless device's preference or permission regarding whether the cellular network can apply a transparent MPTCP proxy on the MPTCP flows established within the MPTCP PDU session. In a 5G NR context, this might include the wireless device initiating the "UE-requested MPTCP PDU Session Establishment" procedure as specified in 3GPP TR 23.793 clause 6.5.4, and in addition to indicating a preference to establish a MPTCP PDU session, the wireless device may also indicate whether the network is allowed to apply a transparent MPTCP proxy or not. Note that such an indication could be provided prior to the network indicating whether a transparent MPTCP proxy is deployed in the cellular network, and/or even if no indication of whether a transparent MPTCP proxy is deployed in the cellular network is provided to the wireless device at all.

Note that such a technique may apply the wireless device's indicated preference or permission with respect to whether the cellular network can apply a transparent MPTCP proxy to any MPTCP connections established as part of the MPTCP PDU session, which may limit the ability of the wireless device to provide some MPTCP traffic through the transparent MPTCP proxy and some MPTCP traffic that flows end-to-end within a single MPTCP PDU session. However, if the wireless device wishes to provide some MPTCP traffic through the transparent MPTCP proxy and some MPTCP traffic that flows end-to-end, it may still be possible for the wireless device to establish multiple MPTCP PDU sessions, e.g., with different indicated preference/permission regarding transparent MPTCP proxy use. In such a scenario, the wireless device might be able to establish any MPTCP connections for which end-to-end MPTCP traffic flow is desired as part of a MPTCP PDU session to which the wireless device has indicated not to apply a transparent MPTCP proxy, and to establish any MPTCP connections for which end-to-end MPTCP traffic flow is not desired as part of a MPTCP PDU session to which the wireless device has indicated to apply a transparent MPTCP proxy.

As another possibility, the wireless device may provide an indication of whether to apply a transparent MPTCP proxy on a per MPTCP connection level, for example during MPTCP connection establishment. In some instances, such an indication may be provided in response to receiving an indication from the cellular network that the cellular network provides a transparent MPTCP proxy. For example, at least according to some embodiments, the cellular network may include a "transparent MPTCP proxy" flag in a PDU session establishment accept message provided to the wireless device during MPTCP PDU session establishment if the cellular network provides a transparent MPTCP proxy.

Based on such an indication from the cellular network, the wireless device may determine to indicate to the MPTCP proxy which MPTCP traffic of the MPTCP PDU session to transmit end-to-end (e.g., to bypass the transparent MPTCP proxy). As one possible mechanism for indicating to which MPTCP traffic of a MPTCP PDU session to apply a MPTCP proxy, the wireless device may set an indicator flag (which may be a single indicator bit or a multiple bit field) during MPTCP connection establishment to a value configured to indicate its preference/permission regarding whether to apply the transparent MPTCP proxy to the MPTCP connection. For example, MPTCP connection initiation may begin with a SYN, SYN/ACK, and ACK exchange on a single path of the MPTCP connection. Each of these packets may include a multipath capable (MP CAPABLE) MPTCP option, which may include certain reserved bits. One of these bits (e.g., the 'D' bit, or any other as-yet-unspecified bit) could be used to indicate whether the wireless device allows the network to apply a transparent MPTCP proxy to traffic associated with the MPTCP connection. For example, setting the indicator bit to '1' could indicate that a UE allows the network to apply a transparent MPTCP proxy on the MPTCP flow, while setting the indicator bit to '0' could indicate that a UE disallows the network to apply a transparent MPTCP proxy on the MPTCP flow, or vice versa.

In 906, the cellular network may determine whether to apply a transparent MPTCP proxy to the MPTCP connection, e.g., based at least in part on the indication from the wireless device of whether to apply a transparent MPTCP proxy to the MPTCP connection. For example, the cellular network may follow the indicated preference of the wireless device, such that for a MPTCP connection for which the wireless device allows the network to apply a transparent MPTCP proxy, the cellular network may apply a transparent MPTCP proxy to the MPTCP connection, while for a MPTCP connection for which the wireless device disallows the network to apply a transparent MPTCP proxy, the cellular network may not apply a transparent MPTCP proxy to the MPTCP connection. Alternatively, it may be possible for the cellular network to determine whether to apply a transparent MPTCP proxy to the MPTCP connection based additionally or alternatively on one or more other considerations, e.g., such that it may in some instances be the case that the cellular network may not follow the indicated preference of the wireless device.

Thus, using such techniques, it may be possible for a wireless device to decide and specify which MPTCP traffic is subject to traversing a MPTCP proxy deployed by a cellular network, and which MPTCP traffic can flow end-to-end without being terminated by such a MPTCP proxy.

FIGS. 10-17 illustrate possible further details of methods that could be used for providing a MPTCP proxy in a cellular network, according to some embodiments. Note that FIGS. 10-17 and the following information are provided as being illustrative of further considerations and possible implementation details relating to the methods of FIGS. 8-9, and are not intended to be limiting to the disclosure as a whole. Numerous variations and alternatives to the details provided herein below are possible and should be considered within the scope of the disclosure.

Figure 10:
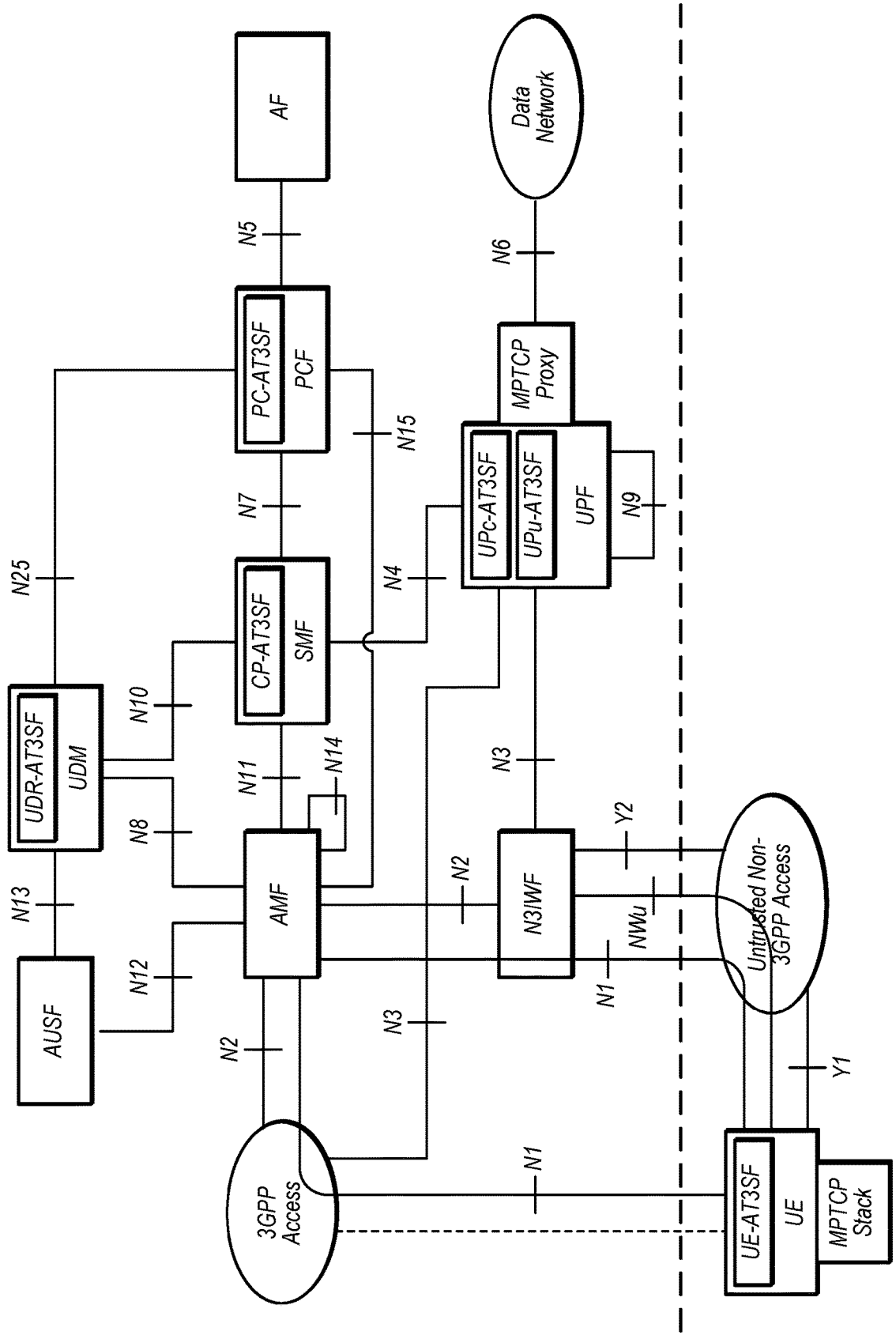

FIG. 10 illustrates various possible elements and communication reference points of a 5G NR cellular network, according to some embodiments. As shown, such a network may support 3GPP access (e.g., by way of a 3GPP RAN and AMF) and untrusted non-3GPP access (e.g., by way of an untrusted access point and a N3IWF function) to the cellular network by a UE that supports MPTCP. A MPTCP proxy may be provided in conjunction with a user plane function (UPF) of the cellular network, and may provide access to a data network. As shown, the cellular network may also include a session management function (SMF), policy control function (PCF), application function (AF), authentication server (AUSF), and unified data management (UDM) function, at least according to some embodiments.

In order to support such MPTCP proxy deployment in a cellular network, it may be important to provide mechanisms to integrate the MPTCP proxies into the 5G core network architecture and for the UE to discover and use MPTCP proxy in different 5G core network configurations. Such mechanisms may include techniques for performing UE provisioning with the MPTCP proxy location and address. Such mechanisms may further include techniques for MPTCP proxy discovery by a 5G NR UE during PDN establishment and through untrusted network access. Techniques for supporting 5G NR radio measurements for NR/LTE/Wi-Fi for MPTCP proxy procedures may also be provided, as well as techniques for second link addition/removal (e.g., for Wi-Fi+5G NR or vice versa; for Wi-Fi in trusted access and in untrusted access). Further, such mechanisms may include techniques for MPTCP management in UEs and networks supporting multiple 5G core network slices, for policies/decision making for MPTCP offloading/mobility/aggregation, and for providing multiple IP address management for MPTCP proxy operation.

Figure 11:
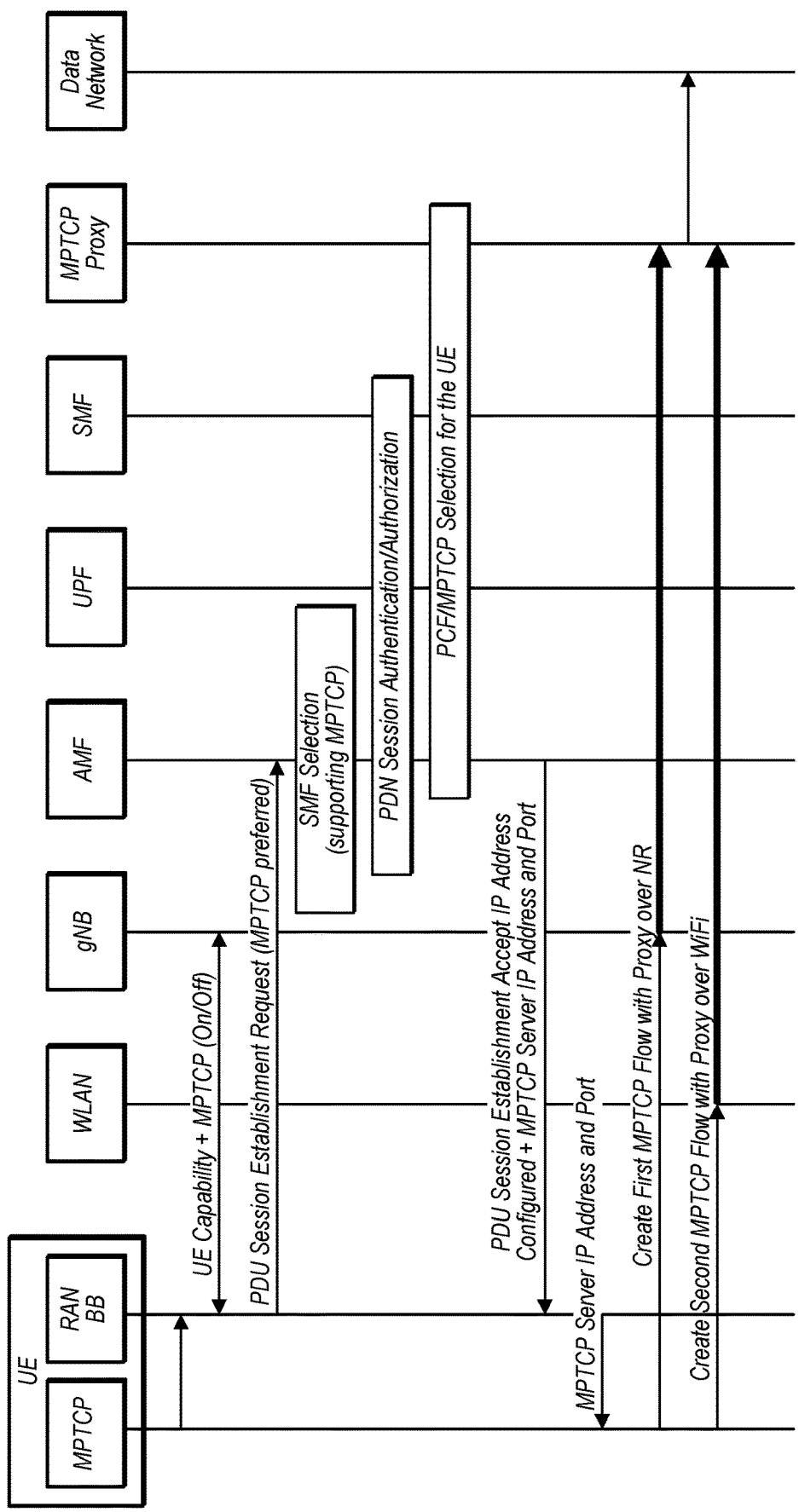

FIG. 11 illustrates an example signal flow that could be used for MPTCP proxy discovery during PDN establishment. As shown, in the illustrated scenario, a MPTCP capable UE may provide UE capability and MPTCP capability (on/off) information to the serving gNB. Via the gNB, the UE may provide a PDU session establishment request to the AMF, indicating that MPTCP is preferred. The AMF may perform SMF selection (e.g., supporting MPTCP), may perform PDN session authentication/authorization with the UPF and SMF, and may perform PCF/MPTCP proxy selection for the UE. The AMF may then provide a PDU session establishment accept message to the UE with a configured IP address, as well as MPTCP server IP address and port information. The UE baseband portion may provide the MPTCP server IP address and port information to the MPTCP layer of the UE, which may create a first MPTCP flow with the MPTCP proxy over NR and a second MPTCP flow with the proxy over Wi-Fi. Note that alternatively, the provisioning could be provided through open mobile alliance (OMA) provisioning or carrier bundle provisioning, e.g., as a OMA-DM object, to the UE.

Figure 12:
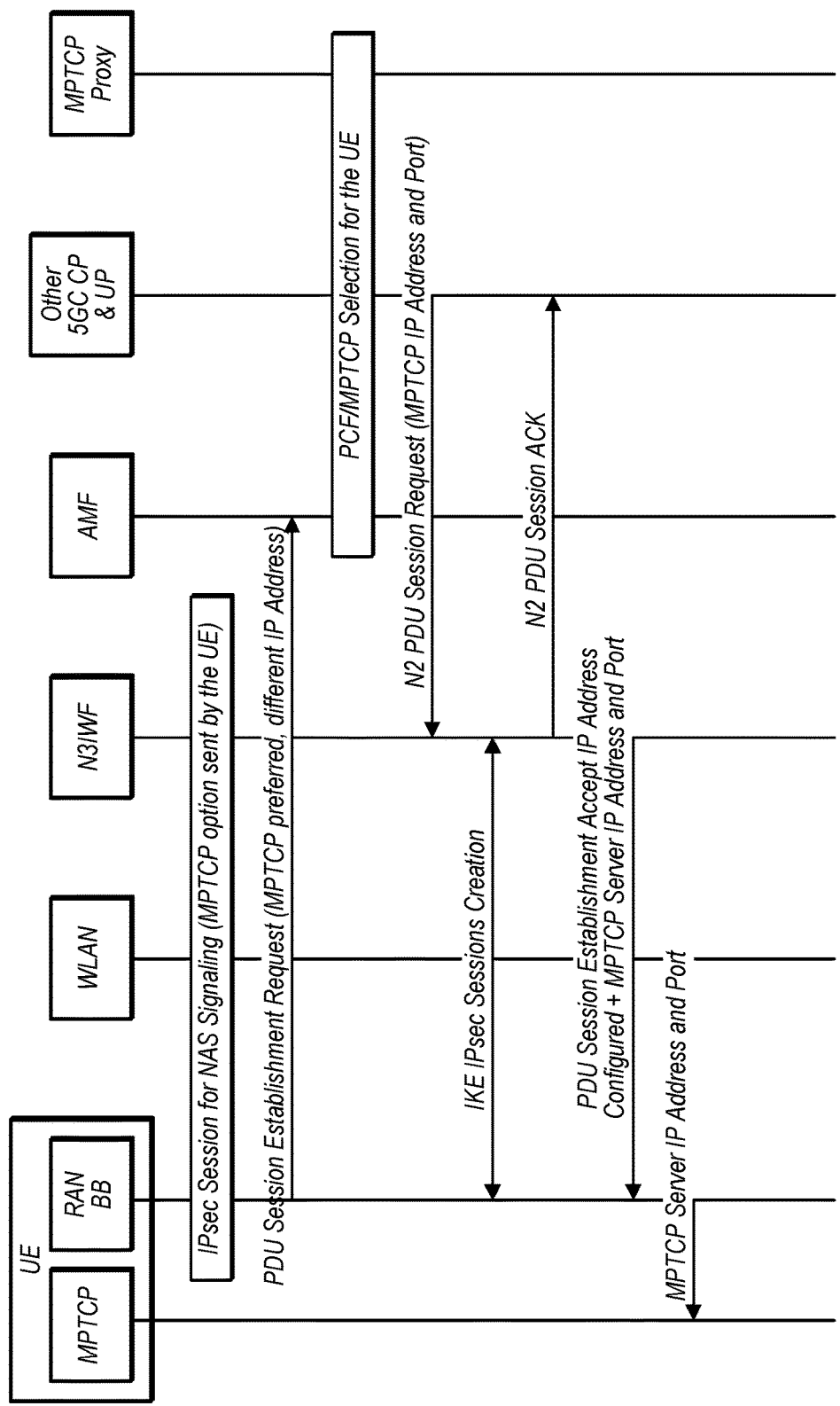

As another possibility, it may be possible to support MPTCP proxy discovery during 5G PDN establishment over an untrusted network. FIG. 12 illustrates an example signal flow that could be used for MPTCP proxy discovery in such a scenario. As shown, the UE may establish an IPsec session for NAS signaling with a N3IWF entity of the 5G NR cellular network by way of an untrusted wireless local area network. The UE may provide a PDU session establishment request to the AMF. The PDU session establishment request may indicate a preference for MPTCP and for a different IP address for MPTCP purposes, e.g., to avoid potential issues with using the same IP address as provided through the N3IWF. The AMF may perform PCF/MPTCP selection for the UE. A N2 PDU session request (e.g., including MPTCP proxy address and port information) may be provided to the N3IWF, which may perform internet key exchange (IKE) IPsec session creation with the UE, acknowledge the N2 PDU session, and provide a PDU session establishment accept indication with IP address configured, as well as MPTCP server IP address and port information. The UE baseband portion may provide the MPTCP server IP address and port information to the MPTCP layer of the UE, which may create MPTCP flows with the MPTCP proxy over NR and Wi-Fi links, in a similar manner as illustrated in FIG. 11, or may otherwise utilize the MPTCP proxy information to establish MPTCP flows with the MPTCP proxy.

Figure 13:
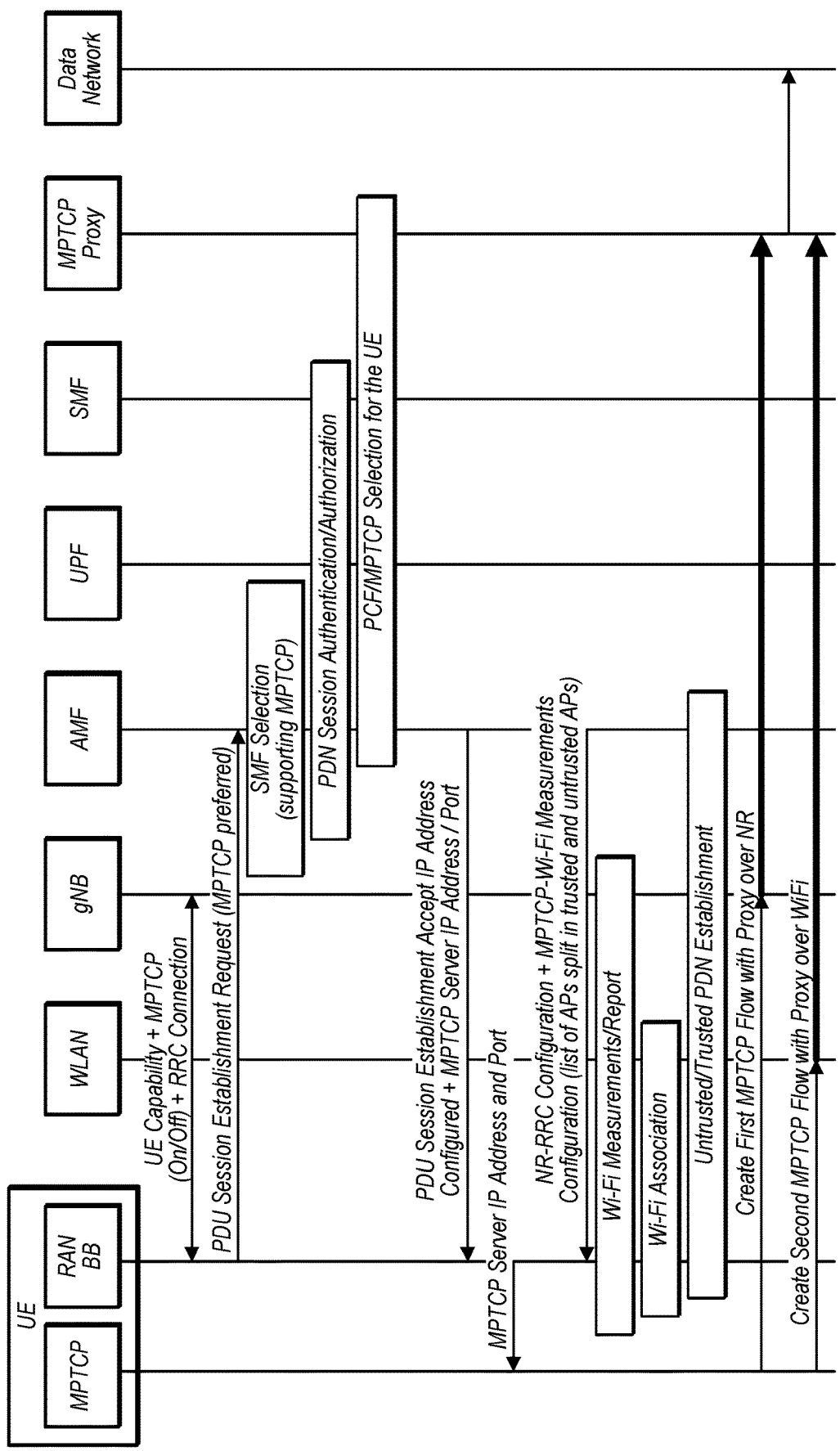

In conjunction with MPTCP proxy operation in a cellular network, it may be useful to provide signaling techniques regarding MPTCP measurements and possible Wi-Fi APs that may be available to use for MPTCP. FIG. 13 illustrates an example signal flow that could be used for performing such signaling, according to some embodiments. As shown, a MPTCP capable UE may establish a PDU session via 5G NR communication, e.g., in a similar manner as illustrated in FIG. 11. In addition to providing MPTCP server IP address and port information, however, the AMF may provide NR RRC configuration signaling, and may indicate (e.g., via NR RRC or NR NAS messages) a MPTCP—Wi-Fi measurement configuration for the UE, e.g., including a list of APs, which may further be split into trusted APs and untrusted APs if desired. The UE may perform Wi-Fi measurements on (e.g., some or all of) the indicated APs, and may provide a measurement report to the serving gNB of the UE. The UE may further use information obtained to form a Wi-Fi association (e.g., with one of the indicated APs), and may perform untrusted or trusted (e.g., depending on the status of the AP providing the Wi-Fi network) PDN establishment with the AMF by way of the selected WLAN. The UE may create MPTCP flows with the MPTCP proxy over NR and Wi-Fi links, in a similar manner as illustrated in FIG. 11, or may otherwise utilize the MPTCP proxy information to establish MPTCP flows with the MPTCP proxy.

Figure 14:
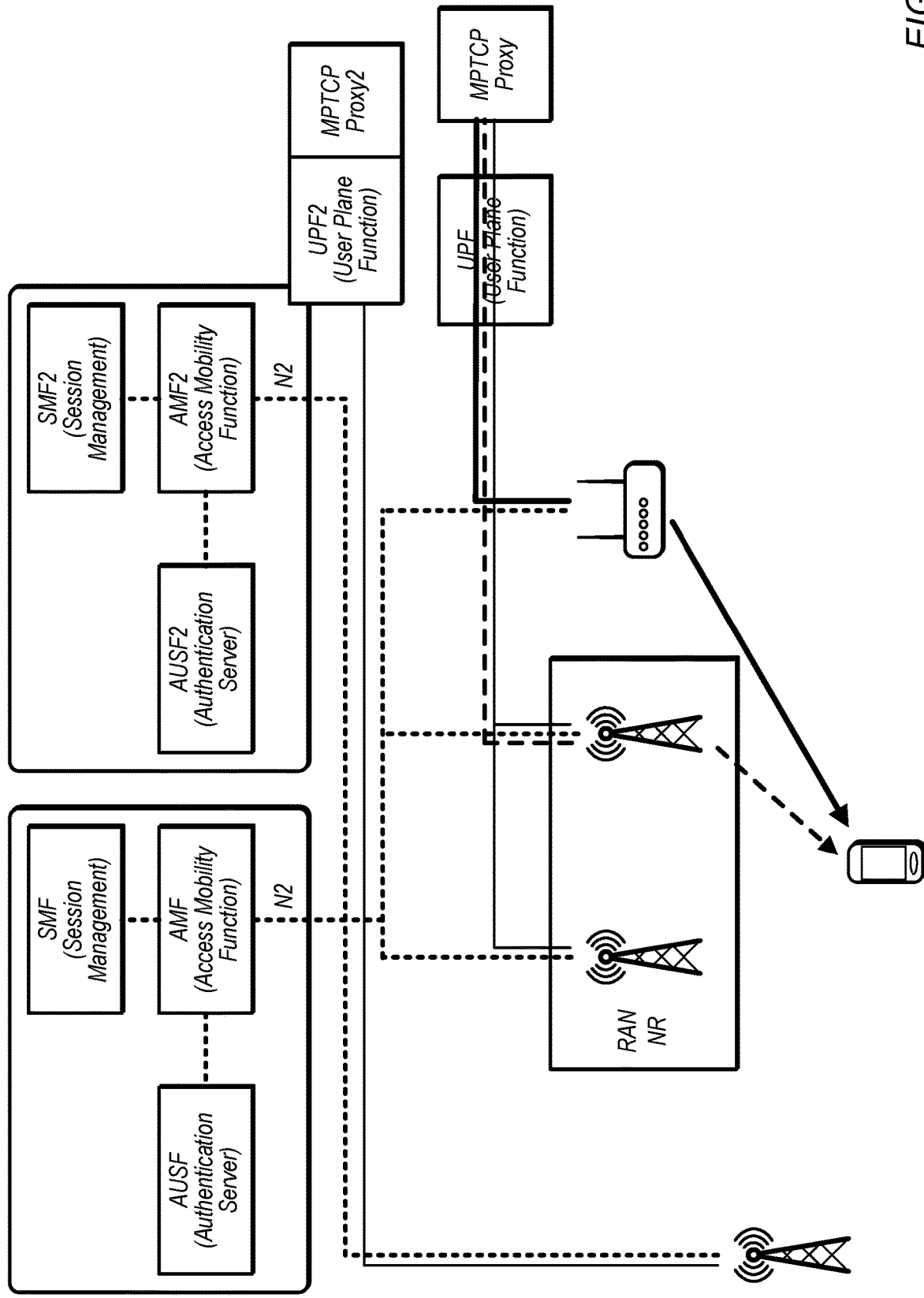
Figure 15:
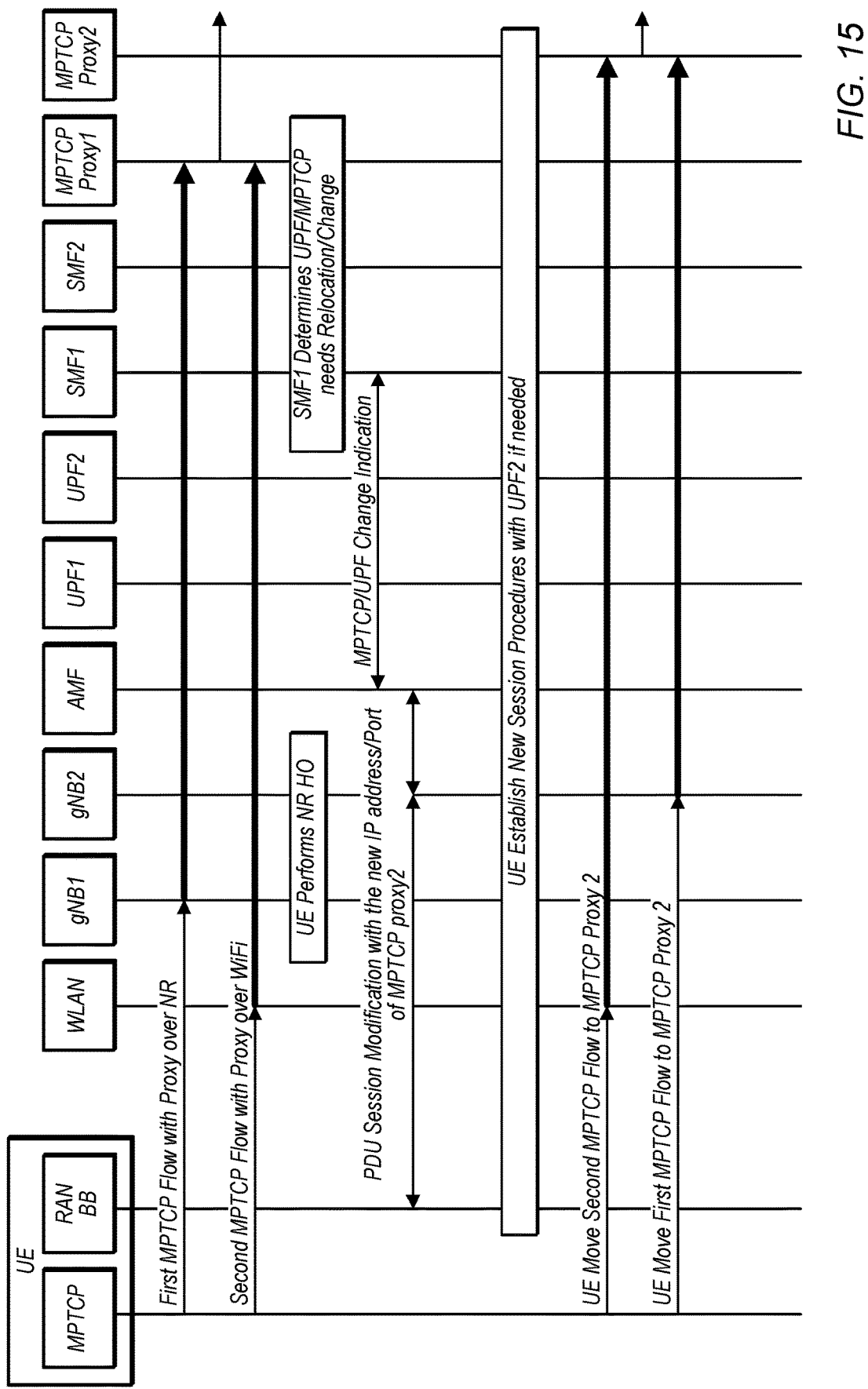

FIGS. 14-15 illustrate various possible aspects of managing UE mobility in a cellular network centric MPTCP proxy deployment framework. FIG. 14 illustrates exemplary architecture elements of a 5G cellular network that supports handover (HO) and mobility between MPTCP proxies, according to some embodiments. As shown, the network may include multiple network management function groups provided for different geographic areas, which may be served by different MPTCP proxies. When a UE performs intra gNB handover or changes Wi-Fi APs such that a different MPTCP proxy should be serving the UE, the UE may be informed that a change of MPTCP proxy is required, so that the UE could move its MPTCP flows from the old MPTCP proxy to the new MPTCP proxy. The UE could use multiple policies at the MPTCP level to decide whether to break its previous MPTCP proxy link before making a new MPTCP proxy link, or vice versa.

FIG. 15 further illustrates an example signal flow that could be used for supporting handover and mobility between MPTCP proxies, according to some embodiments. As shown, a UE may establish MPTCP flows with a first MPTCP proxy, e.g., over NR and Wi-Fi, for example after establishing a PDU session through a trusted or untrusted network using a signaling flow similar to that illustrated in FIG. 11 or FIG. 12. The UE may then perform NR HO, and the SMF1 may determine that the UPF and MPTCP proxy for the UE need to be relocated/changed, e.g., due to the HO. The SMF1 may provide a MPTCP/UPF change indication to the AMF, which may provide a PDU session modification indication with the new IP address and port of the new MPTCP proxy (MPTCP proxy2). The UE may establish new session procedures with the new UPF (UPF2), e.g., if needed. Using the updated IP address and port information for the new MPTCP proxy, the UE may move its MPTCP flows to the new MPTCP proxy.

As previously noted herein, it may also be useful to provide a framework for MPTCP related policies negotiation between a UE and a cellular network. As one possible such mechanism, after PDN establishment and detection of MPTCP proxy support by the UE and the UPF, and the AMF has provided the UE with the IP address and port of the MPTCP proxy, the UE may provide the SMF/AMF with the list of MPTCP policies supported and desired by the UE. These may include an uplink/downlink handover based policy, an uplink/downlink aggregation based policy, and/or a Wi-Fi AP type policy (S2A/S2B), among various possibilities. Based on the UE supported policy or policies, the AMF may select a policy or policies for downlink traffic and may send an indication to the UE to support the same policy for uplink traffic. NAS signaling or IP messages could be used for such a negotiation exchange between the UE and the AMF/SMF.

In some instances, a UE may be responsible for establishing new PDU session(s) based on UE route selection policies (URSP) rules provided by the network (e.g., the PCF) and/or preconfigured in the UE. As such, URSP rules may provide service data flow (SDF) level steering capability for the UE to establish new PDU session(s) over the preferred access network based on traffic descriptor and rule preference. Accordingly, URSP rules may be extended to indicate a list of applications to a UE for which a Multi-Access PDU session should be established, at least according to some embodiments. For example, a "Multi-Access" field in the Route Selection Descriptor may specify whether to establish a Multi-Access PDU session for the matching application. As another possibility, if present, in the case of WLAN access, the Limited SSID(s) for MPTCP field may specify a list of SSID(s) that are allowed on the WLAN access when MPTCP is used. The PCF may select the URSP rules applicable for each UE based on local configuration and operator policies, e.g., taking into consideration UE location, time of day, and/or any of various other possible considerations.

According to some embodiments, the SMF may map the policy and charging control (PCC) rules for a UE into access traffic steering, switching, and splitting (ATSSS) rules, which may be sent to a UE via the AMF. An ATSSS rule may include a precedence value, which may identify the priority of the ATSSS rule with respect to other ATSSS rules, a traffic descriptor, which may identify a SDF, and may for example include an application ID, IP descriptors, non-IP descriptors, etc., and steering mode(s), which may identify how the matching SDF should be steered across 3GPP and non-3GPP accesses. For example, an active-standby steering mode could be used for an MPTCP service that provides seamless handover between non-3GPP and 3GPP access in order to preserve the connection, while a smallest delay steering mode could be used for a service whereby MPTCP attempts to use the lowest-latency interface, and a load balancing steering mode could be used for an MPTCP service that aggregates the capabilities of the access networks in an attempt to increase throughput and minimize latency, among various possibilities. The steering decision may be performed by taking into account the congestion and delay information of the individual TCP subflows of the MPTCP connection, as one possibility. The UE may also take into account Access Measurement Reports, e.g., to complement the steering and path-management decisions.

Figure 16:
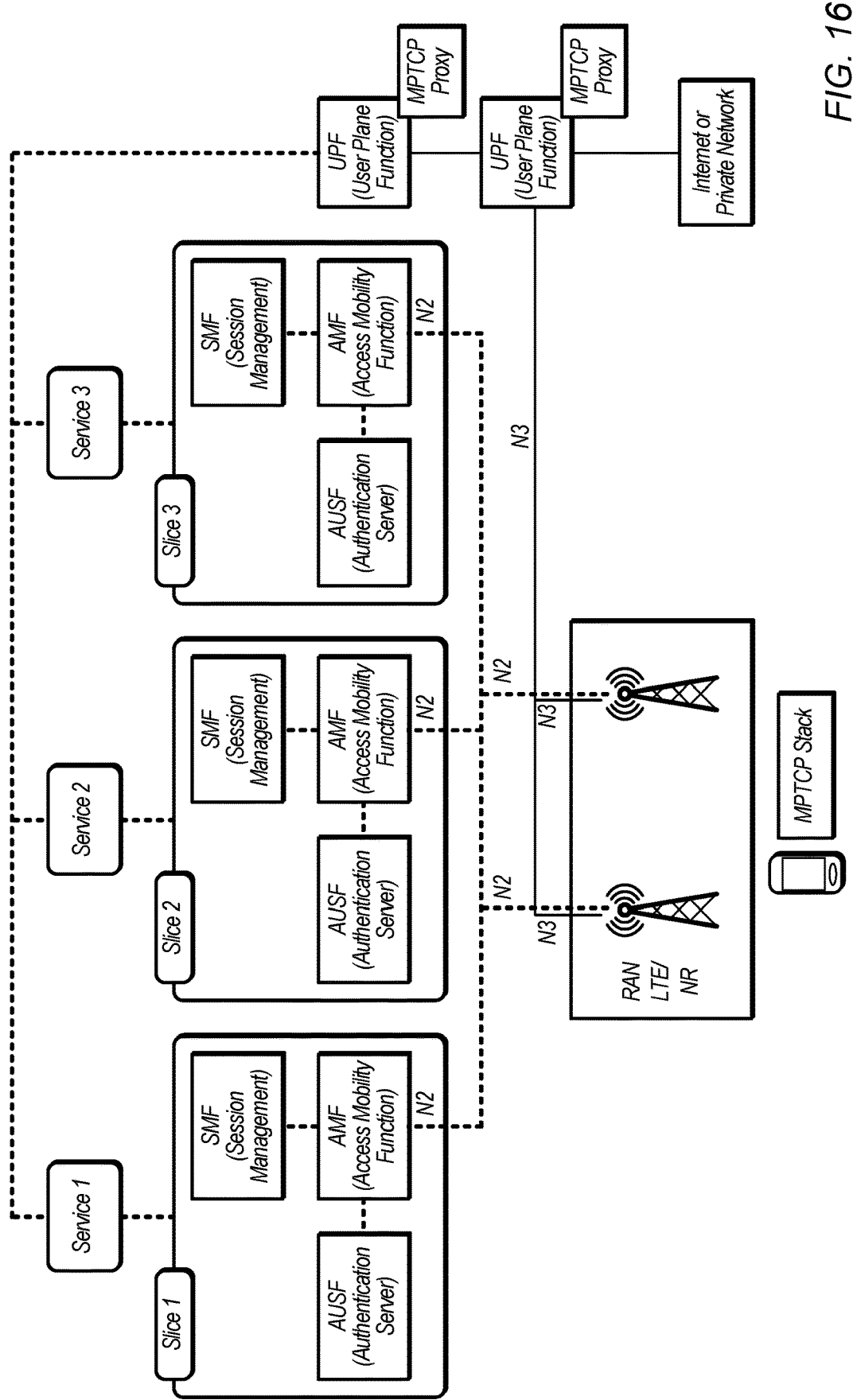

Still further, it may be useful to provide a framework for providing MPTCP proxies in a cellular network that functions well in a cellular network architecture that includes multiple core network slices. FIG. 16 illustrates exemplary architecture elements of a 5G cellular network that supports such MPTCP use in conjunction with multiple network slices, according to some embodiments. As shown, a UE may be able to obtain access to any of slice 1, slice 2, or slice 3 (and possibly multiple slices at the same time) of the illustrated cellular network via the RAN provided by the cellular network. Each slice could be connected to the same or a different MPTCP proxy as the other slices. For example, in the illustrated scenario, there may be two MPTCP proxies serving the three illustrated network slices. It may be the case that one of the MPTCP proxies serves one of the slices while the other MPTCP proxy serves the other two slices, or each MPTCP proxy could be capable of serving any of the illustrated slices, or each MPTCP proxy may serve a single network slice, among various possibilities.

However the MPTCP proxy or proxies are arranged to serve the various network slices deployed by the cellular network, during the RRC connection/PDN establishment to a specific slice, the UE may inform the network of its MPTCP capabilities and if it already has a MPTCP proxy configured. The AMF/SMF may use the information from the UE and could select a new MPTCP proxy or an additional MPTCP proxy for the slice (or could allow the UE to continue using an already configured MPTCP proxy, e.g., if the already configured MPTCP proxy can serve the slice). In some embodiments, it may be useful to configure all UE MPTCP flows belonging to the same slice to be connected to the same MPTCP proxy.

As noted previously herein with respect to FIG. 9, in some instances it may be useful to provide a mechanism for a UE to control transparent MPTCP proxy traversal, and one possible such mechanism may include use of a reserved flag in the MP CAPABLE option that is included during a MPTCP connection establishment handshake. FIG. 17 illustrates one possible format of the MP CAPABLE option, as defined in draft-ietf-mptcp-rfc6824bis-11, as an example. If such a format is used for the MP CAPABLE option, it may be the case that one of the flags A-H could be defined as indicating whether an endpoint (such as a UE) allows application (e.g., by a cellular network) of a MPTCP proxy to the MPTCP traffic of the MPTCP connection. For example, the 'D' bit illustrated in FIG. 17 could be defined as such, as one possibility.

In the following further exemplary embodiments are provided.

One set of embodiments may include a method, comprising: by a wireless device: establishing a first wireless link with a cellular network; providing an indication that the wireless device is multipath transmission control protocol (MPTCP) capable to a core network entity of the cellular network; receiving MPTCP proxy information for a MPTCP proxy comprised in the cellular network from the core network entity; and establishing a first MPTCP flow with the MPTCP proxy comprised in the cellular network via the wireless link.

According to some embodiments, the method further comprises: establishing a second MPTCP flow with the MPTCP proxy comprised in the cellular network via a second wireless link, wherein the first wireless link comprises a cellular link according to 5G NR, wherein the second wireless link comprises a Wi-Fi link.

According to some embodiments, the MPTCP proxy information comprises MPTCP server IP address and port information.

According to some embodiments, the method further comprises: establishing a second MPTCP flow with the MPTCP proxy comprised in the cellular network via a second wireless link, wherein the first wireless link comprises a Wi-Fi link, wherein the second wireless link comprises a cellular link according to 5G NR, wherein the indication that the wireless device is MPTCP capable is provided and the MPTCP proxy information is received via a non-3GPP interworking function (N3IWF) of the cellular network.

According to some embodiments, the method further comprises: receiving configuration information from the core network entity indicating one or more Wi-Fi access points; performing measurements on the one or more Wi-Fi access points indicated by the core network entity; selecting a Wi-Fi access point with which to associate based at least in part on the measurements; and establishing a second MPTCP flow with the MPTCP proxy comprised in the cellular network via the Wi-Fi access point.

According to some embodiments, the method further comprises: performing handover from a first cell of the cellular network to a second cell of the cellular network; receiving an indication from a core network entity of the cellular network of MPTCP proxy information for a second MPTCP proxy based at least in part on the handover; and moving the first MPTCP flow to the second MPTCP proxy based at least in part on the indication of MPTCP proxy information for the second MPTCP proxy.

According to some embodiments, the method further comprises: providing MPTCP policy information indicating one or more MPTCP policies supported and/or requested by the wireless device to the core network entity; and receiving MPTCP policy information indicating one or more MPTCP policies selected by the core network entity for the wireless device in response to the MPTCP policy information indicating one or more MPTCP policies supported and/or requested by the wireless device.

According to some embodiments, the MPTCP proxy information for a MPTCP proxy comprised in the cellular network from the core network entity comprises first MPTCP proxy information for a first MPTCP proxy comprised in the cellular network, wherein the first MPTCP proxy is associated with a first core network slice, wherein the method further comprises: receiving second MPTCP proxy information for a second MPTCP proxy comprised in the cellular network, wherein the second MPTCP proxy is associated with a second core network slice; and establishing a second MPTCP flow with the second MPTCP proxy comprised in the cellular network via the wireless link while the first MPTCP flow with the first MPTCP proxy is also active.

Another set of embodiments may include a method, comprising: by a cellular network element of a cellular network: establishing a first wireless link with a wireless device; receiving an indication that the wireless device is multipath transmission control protocol (MPTCP) capable; and providing MPTCP proxy information for a MPTCP proxy comprised in the cellular network to the wireless device based at least in part on the indication that the wireless device is MPTCP capable.

According to some embodiments, the cellular network element comprises a Access Management Function (AMF), wherein the indication that the wireless device is MPTCP capable is received and the MPTCP proxy information is provided via 3GPP 5G NR cellular communication.

According to some embodiments, the cellular network element comprises a Access Management Function (AMF), wherein the indication that the wireless device is MPTCP capable is received and the MPTCP proxy information is provided via a non-3GPP interworking function (N3IWF) of the cellular network.

According to some embodiments, the method further comprises: providing configuration information to the wireless device indicating one or more Wi-Fi access points based at least in part on the indication that the wireless device is MPTCP capable.

According to some embodiments, the method further comprises: providing updated MPTCP proxy information for a different MPTCP proxy to the wireless device based at least in part on a mobility event for the wireless device.

According to some embodiments, the method further comprises: receiving MPTCP policy information indicating one or more MPTCP policies supported and/or requested by the wireless device; selecting MPTCP policy information for the wireless device based at least in part on the indication of the one or more MPTCP policies supported and/or requested by the wireless device; and providing the selected MPTCP policy information to the wireless device.

According to some embodiments, the method further comprises: determining that the wireless device is configured to attach to a first core network slice, wherein the MPTCP proxy is associated with a first core network slice, wherein the proxy information for the MPTCP proxy associated with the first core network slice is provided to the wireless device based at least in part on determining that the wireless device is configured to attach to the first core network slice; determining that the wireless device is also configured to attach to a second core network slice; and providing MPTCP proxy information for a MPTCP proxy associated with the second core network slice to the wireless device based at least in part on determining that the wireless device is also configured to attach to the second core network slice.

Another set of embodiments may include a method, comprising: by a wireless device: establishing a first wireless link with a cellular network; initiating a multipath transmission control protocol (MPTCP) connection via the first wireless link; and providing an indication of whether to apply a transparent MPTCP proxy to the MPTCP connection.

According to some embodiments, the indication of whether to apply a transparent MPTCP proxy to the MPTCP connection is provided using an indicator bit of a multipath capable MPTCP option when initiating the MPTCP connection.

According to some embodiments, the method further comprises: receiving an indication that the cellular network provides a transparent MPTCP proxy, wherein the indication of whether to apply a transparent MPTCP proxy to the MPTCP connection is provided based at least in part on receiving the indication that the cellular network provides a transparent MPTCP proxy.

According to some embodiments, the indication of whether to apply a transparent MPTCP proxy to the MPTCP connection is provided during initiation of a protocol data unit (PDU) data session with the cellular network.

Still another set of embodiments may include a method, comprising: by a cellular network element of a cellular network: establishing a first wireless link with a wireless device; receiving an indication of whether to apply a transparent MPTCP proxy to a MPTCP connection of the wireless device; and determining whether to apply a transparent MPTCP proxy to the MPTCP connection of the wireless device based at least in part on the indication.

According to some embodiments, the indication of whether to apply a transparent MPTCP proxy to the MPTCP connection is received using an indicator bit of a multipath capable MPTCP option when the MPTCP connection is initiated.

According to some embodiments, the method further comprises: providing an indication that the cellular network provides a transparent MPTCP proxy, wherein the indication of whether to apply a transparent MPTCP proxy to the MPTCP connection is received based at least in part on receiving the indication that the cellular network provides a transparent MPTCP proxy.

According to some embodiments, the indication of whether to apply a transparent MPTCP proxy to the MPTCP connection is received during initiation of a protocol data unit (PDU) data session with the wireless device.

Another exemplary embodiment may include a device, comprising: an antenna; a radio coupled to the antenna; and a processing element operably coupled to the radio, wherein the device is configured to implement any or all parts of the preceding examples.

Another exemplary embodiment may include a device, comprising: a network interface; and a processing element coupled to the network interface; wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a network element 500) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising: a processor configured to cause a wireless device to:
   establish a first wireless link with a cellular network, wherein the first wireless link comprises a non-3GPP link;
   provide an indication that the wireless device is multipath transmission control protocol (MPTCP) capable to a core network entity of the cellular network, wherein the indication that the wireless device is MPTCP capable is provided via a non-3GPP interworking function (N3IWF) of the cellular network;
   receive MPTCP proxy information for a MPTCP proxy comprised in the cellular network from the core network entity, wherein the MPTCP proxy information comprises MPTCP server IP address and port information, and wherein the MPTCP proxy information is received via the N3IWF;
   establish a first MPTCP flow with the MPTCP proxy comprised in the cellular network via the first wireless link; and
   establish a second MPTCP flow with the MPTCP proxy comprised in the cellular network via a second wireless link, wherein the second wireless link comprises a cellular link according to 5G NR.

2. The apparatus of claim 1, wherein the first wireless link comprises a Wi-Fi link.

3. The apparatus of claim 1, wherein the processor is further configured to cause the wireless device to:
   receive configuration information from the core network entity indicating one or more Wi-Fi access points;
   perform measurements on the one or more Wi-Fi access points indicated by the core network entity; and
   select a Wi-Fi access point with which to associate based at least in part on the measurements;
   wherein said establishing the first MPTCP flow with the MPTCP proxy comprised in the cellular network is performed via the Wi-Fi access point.

4. The apparatus of claim 1, wherein the processor is further configured to cause the wireless device to:
   perform handover from a first cell of the cellular network to a second cell of the cellular network;

receive an indication from a core network entity of the cellular network of MPTCP proxy information for a second MPTCP proxy based at least in part on the handover; and move the first MPTCP flow to the second MPTCP proxy based at least in part on the indication of MPTCP proxy information for the second MPTCP proxy.

5. The apparatus of claim 1, wherein the processor is further configured to cause the wireless device to:

provide MPTCP policy information indicating one or more MPTCP policies supported and/or requested by the wireless device to the core network entity; and receive MPTCP policy information indicating one or more MPTCP policies selected by the core network entity for the wireless device in response to the MPTCP policy information indicating one or more MPTCP policies supported and/or requested by the wireless device.

6. A cellular network element of a cellular network, comprising:

a network interface; and a processor coupled to the network interface;

wherein the cellular network element is configured to:

establish a first wireless link with a wireless device;

receive an indication that the wireless device is multipath transmission control protocol (MPTCP) capable, wherein the indication that the wireless device is MPTCP capable is received via a non-3GPP interworking function (N3IWF) of the cellular network; and provide MPTCP proxy information to the wireless device based at least in part on the indication that the wireless device is MPTCP capable, wherein the MPTCP proxy information is provided via the N3IWF.

7. The cellular network element of claim 6, wherein the cellular network element is further configured to:

provide configuration information to the wireless device indicating one or more Wi-Fi access points based at least in part on the indication that the wireless device is MPTCP capable.

8. The cellular network element of claim 6, wherein the cellular network element is further configured to:

receive MPTCP policy information indicating one or more MPTCP policies supported and/or requested by the wireless device;

select MPTCP policy information for the wireless device based at least in part on the indication of the one or more MPTCP policies supported and/or requested by the wireless device; and provide the selected MPTCP policy information to the wireless device.

9. The cellular network element of claim 6, wherein the cellular network element is further configured to:

determine that the wireless device is configured to attach to a first core network slice, wherein the MPTCP proxy is associated with a first core network slice, wherein the proxy information for the MPTCP proxy associated with the first core network slice is provided to the wireless device based at least in part on determining that the wireless device is configured to attach to the first core network slice;

determine that the wireless device is also configured to attach to a second core network slice; and provide MPTCP proxy information for a MPTCP proxy associated with the second core network slice to the wireless device based at least in part on determining that the wireless device is also configured to attach to the second core network slice.

10. The cellular network element of claim 6, wherein the cellular network element is further configured to:

receive an indication of whether to apply a transparent MPTCP proxy to a MPTCP connection of the wireless device; and determine whether to apply a transparent MPTCP proxy to the MPTCP connection of the wireless device based at least in part on the indication.

11. The cellular network element of claim 10, wherein the indication of whether to apply a transparent MPTCP proxy to the MPTCP connection is received using an indicator bit of a multipath capable MPTCP option when the MPTCP connection is initiated.

12. The cellular network element of claim 11, wherein the cellular network element is further configured to:

provide an indication that the cellular network provides a transparent MPTCP proxy, wherein the indication of whether to apply a transparent MPTCP proxy to the MPTCP connection is received based at least in part on receiving the indication that the cellular network provides a transparent MPTCP proxy.

13. The cellular network element of claim 10, wherein the indication of whether to apply a transparent MPTCP proxy to the MPTCP connection is received during initiation of a protocol data unit (PDU) data session with the wireless device.

14. A wireless device, comprising:

an antenna;

a radio coupled to the antenna; and a processor coupled to the radio;

wherein the wireless device is configured to:

establish a first wireless link with a cellular network, wherein the first wireless link comprises a non-3GPP link;

provide an indication that the wireless device is multipath transmission control protocol (MPTCP) capable to a core network entity of the cellular network, wherein the indication that the wireless device is MPTCP capable is provided via a non-3GPP interworking function (N3IWF) of the cellular network;

receive MPTCP proxy information for a MPTCP proxy comprised in the cellular network from the core network entity, wherein the MPTCP proxy information comprises MPTCP server IP address and port information, and wherein the MPTCP proxy information is received via the N3IWF; and establish MPTCP flow with the MPTCP proxy comprised in the cellular network via the first wireless link.

15. The wireless device of claim 14, wherein the wireless device is configured to:

provide an indication of whether to apply a transparent MPTCP proxy to the MPTCP connection.

16. The wireless device of claim 15, wherein the indication of whether to apply a transparent MPTCP proxy to the MPTCP connection is provided using an indicator bit of a multipath capable MPTCP option when initiating the MPTCP connection.

17. The wireless device of claim 16, wherein the wireless device is further configured to:

receive an indication that the cellular network provides a transparent MPTCP proxy, wherein the indication of whether to apply a transparent MPTCP proxy to the MPTCP connection is provided based at least in part on receiving the indication that the cellular network provides a transparent MPTCP proxy.

18. The wireless device of claim 15, wherein the indication of whether to apply a transparent MPTCP proxy to the MPTCP connection is provided during initiation of a protocol data unit (PDU) data session with the cellular network.

19. The wireless device of claim 14, wherein the wireless device is configured to:
establish a second MPTCP flow with the MPTCP proxy comprised in the cellular network via a second wireless link, wherein the second wireless link comprises a cellular link according to 5G NR.

* * * * *